US011906625B2

(12) United States Patent
Rangesh et al.

(10) Patent No.: US 11,906,625 B2
(45) Date of Patent: Feb. 20, 2024

(54) SURROUND VEHICLE TRACKING AND MOTION PREDICTION

(71) Applicant: The Regents of the University of California, Oakland, CA (US)

(72) Inventors: Akshay Rangesh, San Diego, CA (US); Mohan M. Trivedi, San Diego, CA (US); Nachiket Deo, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 860 days.

(21) Appl. No.: 16/960,290

(22) PCT Filed: Jan. 8, 2019

(86) PCT No.: PCT/US2019/012773
§ 371 (c)(1),
(2) Date: Jul. 6, 2020

(87) PCT Pub. No.: WO2019/136479
PCT Pub. Date: Jul. 11, 2019

(65) Prior Publication Data
US 2021/0056713 A1    Feb. 25, 2021

Related U.S. Application Data

(60) Provisional application No. 62/614,849, filed on Jan. 8, 2018.

(51) Int. Cl.
*G01S 17/89* (2020.01)
*G06T 7/292* (2017.01)
(Continued)

(52) U.S. Cl.
CPC .......... *G01S 17/89* (2013.01); *B60W 30/0956* (2013.01); *G01S 17/66* (2013.01);
(Continued)

(58) Field of Classification Search
CPC .......... G01S 17/89; G01S 17/66; G01S 17/86; G01S 17/931; B60W 30/0956;
(Continued)

(56) References Cited

U.S. PATENT DOCUMENTS

2010/0191391 A1* 7/2010 Zeng ................. G01S 13/87
701/1
2011/0231016 A1* 9/2011 Goulding ............. G05D 1/0088
901/1

(Continued)

OTHER PUBLICATIONS

Henriques et al., ("High-Speed Tracking with Kernelized Correlation Filters", IEEE Transactions on Pattern Analysis and Machine Intelligence, vol. 37, No. 3, Mar. 2015) (Year: 2015).*

(Continued)

*Primary Examiner* — Amara Abdi
(74) *Attorney, Agent, or Firm* — Mintz Levin Cohn Ferris Glovsky and Popeo, P.C.

(57) ABSTRACT

A surround multi-object tracking and surround vehicle motion prediction framework is provided. A full-surround camera array and LiDAR sensor based approach provides for multi-object tracking for autonomous vehicles. The multi-object tracking incorporates a fusion scheme to handle object proposals from the different sensors within the calibrated camera array. A motion prediction framework leverages the instantaneous motion of vehicles, an understanding of motion patterns of freeway traffic, and the effect of inter-vehicle interactions. The motion prediction framework incorporates probabilistic modeling of surround vehicle trajectories. Additionally, subcategorizing trajectories based on maneuver classes leads to better modeling of motion patterns. A model takes into account interactions between surround vehicles for simultaneously predicting each of their motion.

19 Claims, 20 Drawing Sheets

(51) Int. Cl.
| G06T 7/246 | (2017.01) |
| G06T 7/70 | (2017.01) |
| G01S 17/931 | (2020.01) |
| G01S 17/86 | (2020.01) |
| B60W 30/095 | (2012.01) |
| G01S 17/66 | (2006.01) |
| G06F 18/24 | (2023.01) |
| G06F 18/25 | (2023.01) |
| B60W 50/00 | (2006.01) |

(52) U.S. Cl.
CPC ............ *G01S 17/86* (2020.01); *G01S 17/931* (2020.01); *G06F 18/24* (2023.01); *G06F 18/251* (2023.01); *G06T 7/251* (2017.01); *G06T 7/292* (2017.01); *G06T 7/70* (2017.01); *B60W 50/0097* (2013.01); *B60W 2050/0028* (2013.01); *B60W 2420/42* (2013.01); *B60W 2420/52* (2013.01); *B60W 2554/404* (2020.02); *B60W 2556/35* (2020.02); *G06T 2207/10016* (2013.01); *G06T 2207/10028* (2013.01); *G06T 2207/20076* (2013.01); *G06T 2207/30241* (2013.01); *G06T 2207/30252* (2013.01)

(58) Field of Classification Search
CPC ..... B60W 50/0097; B60W 2050/0028; B60W 2420/42; B60W 2420/52; B60W 2554/404; B60W 2556/35; B60W 60/00272; G06F 18/24; G06F 18/251; G06T 7/251; G06T 7/292; G06T 7/70; G06T 2207/10016; G06T 2207/10028; G06T 2207/20076; G06T 2207/30241; G06T 2207/30252; G06T 2207/30261; G06T 7/248

See application file for complete search history.

(56) References Cited

U.S. PATENT DOCUMENTS

| 2012/0083974 | A1 | 4/2012 | Sandblom | |
| 2012/0140061 | A1 | 6/2012 | Zeng | |
| 2013/0054106 | A1 | 2/2013 | Schmudderich | |
| 2013/0179382 | A1* | 7/2013 | Fritsch | G08G 1/161 706/46 |
| 2015/0198443 | A1* | 7/2015 | Yi | G06V 20/52 702/150 |
| 2016/0313133 | A1* | 10/2016 | Zeng | B60W 60/0011 |
| 2016/0365068 | A1* | 12/2016 | Sakaguchi | B60K 35/00 |
| 2017/0120803 | A1* | 5/2017 | Kentley | B60W 10/04 |
| 2017/0206431 | A1 | 7/2017 | Sun | |
| 2017/0358102 | A1* | 12/2017 | Akiyama | G06T 7/20 |

OTHER PUBLICATIONS

Morris et al., (Trajectory Learning for Activity Understanding: Unsupervised, Multilevel, and Long-Term Adaptive Approach, IEEE Transactions on Pattern Analysis and Machine Intelligence, vol. 33, No. 11, Nov. 2011) (Year: 2011).*

Polychronopoulos, (Sensor Fusion for Predicting Vehicles' Path for Collision Avoidance Systems, IEEE Transactions on Intelligent Transportation Systems, vol. 8, No. 3, Sep. 2007) (Year: 2007).*

Dueholm et al., (Trajectories and Maneuvers of Surrounding Vehicles With Panoramic Camera Arrays, IEEE Transactions on Intelligent Vehicles, vol. 1, No. 2, Jun. 2016) (Year: 2016).*

Sivaraman et al., (Dynamic Probabilistic Drivability Maps for Lane Change and Merge Driver Assistance, IEEE Transactions on Intelligent Transportation Systems, vol. 15, No. 5, Oct. 2014) (Year: 2014).*

Bae, S.-H. et al., "Robust Online Multi-Object Tracking Based on Tracklet Confidence and Online Discriminative Appearance Learning," in Proceedings of the IEEE Conference on Computer Vision and Pattern Recognition, 2014, pp. 1218-1225. (Year: 2014).*

Asvadi, A. et al., "3D LIDAR-Based Static and Moving Obstacle Detection in Driving Environments: An Approach Based on Voxels and Multi-Region Ground Planes," Robotics and Autonomous Systems, vol. 83, pp. 299-311, 2016. (Year: 2016).*

Allodi, M. et al., "Machine Learning in Tracking Associations with Stereo Vision and LiDAR Observations for an Autonomous Vehicle," in Intelligent Vehicles Symposium (IV), 2016 IEEE. IEEE, 2016, pp. 648-653.

Ammoun, S. et al., "Real Time Trajectory Prediction for Collision Risk Estimation between Vehicles," In Intelligent Computer Communication and Processing, 2009. ICCP 2009. IEEE 5th International Conference on, pp. 417-422. IEEE, 2009.

Aoude, G. S. et al., "Threat Assessment Design for Driver Assistance System at Intersections," In Intelligent Transportation Systems (ITSC), 2010 13th International IEEE Conference on, pp. 1855-1862. IEEE, 2010. Harvard.

Asvadi, A. et al., "3D LiDAR-Based Static and Moving Obstacle Detection in Driving Environments: An Approach Based on Voxels and Multi-Region Ground Planes," Robotics and Autonomous Systems, vol. 83, pp. 299-311, 2016.

Asvadi, A. et al., "3D Object Tracking Using RGB and LiDAR Data," in Intelligent Transportation Systems (ITSC), 2016 IEEE 19th International Conference on. IEEE, 2016, pp. 1255-1260.

Asvadi, A. et al., "Detection and Tracking of Moving Objects Using 2.5D Motion Grids," in Intelligent Transportation Systems (ITSC), 2015 IEEE 18th International Conference on. IEEE, 2015, pp. 788-793.

Babenko, B. et al., "Robust Object Tracking with Online Multiple Instance Learning," IEEE Transactions On Pattern Analysis And Machine Intelligence, vol. 33, No. 8, pp. 1619-1632, 2011.

Bae, S.-H. et al., "Robust Online Multi-Object Tracking Based on Tracklet Confidence and Online Discriminative Appearance Learning," in Proceedings of the IEEE Conference on Computer Vision and Pattern Recognition, 2014, pp. 1218-1225.

Bao, C. et al., "Real Time Robust L1 Tracker Using Accelerated Proximal Gradient Approach," in Computer Vision and Pattern Recognition (CVPR), 2012 IEEE Conference on. IEEE, 2012, pp. 18301837.

Barth, A et al., "Where Will the Oncoming Vehicle be the Next Second?," In Intelligent Vehicles Symposium, 2008 IEEE, pp. 1068-1073. IEEE, 2008.

Baum, L. E. et al., "A Maximization Technique Occurring in the Statistical Analysis of Probabilistic Functions of Markov Chains," The Annals of Mathematical Statistics 41, No. 1 (1970): 164-171.

Berclaz, J. et al., "Multiple Object Tracking Using K-Shortest Paths Optimization," IEEE Transactions on Pattern Analysis and Machine Intelligence, vol. 33, No. 9, pp. 1806-1819, 2011.

Bernardin, K. et al., "Evaluating Multiple Object Tracking Performance: The Clear MOT Metrics," EURASIP Journal on Image and Video Processing, vol. 2008, No. 1, pp. 1-10, 2008.

Berndt, H. et al., "Continuous Driver Intention Recognition with Hidden Markov Models," In Intelligent Transportation Systems, 2008. ITSC 2008. 11th International IEEE Conference on, pp. 1189-1194. IEEE, 2008.

Bishop, C. M. "Pattern Recognition and Machine Learning," (2006) pp. 1-58.

Bouguet, J.-Y. "Pyramidal Implementation of the Affine Lucas Kanade Feature Tracker Description of the Algorithm," Intel Corporation, vol. 5, No. 1-10, p. 4, 2001.

Breitenstein, M. D. et al., "Online Multiperson Tracking-By-Detection from a Single, Uncalibrated Camera," IEEE Transactions on Pattern Analysis and Machine Intelligence, vol. 33, No. 9, pp. 1820-1833, 2011.

Broggi, A. et al., "A full-3D Voxel-based Dynamic Obstacle Detection for Urban Scenario using Stereo Vision," in Intelligent Transportation Systems—(ITSC), 2013 16th International IEEE Conference on. IEEE, 2013, pp. 71-76.

Butt, A. A. et al., "Multi-Target Tracking by Lagrangian Relaxation to Min-Cost Network Flow," in Proceedings of the IEEE Conference on Computer Vision and Pattern Recognition, 2013, pp. 1846-1853.

(56) References Cited

OTHER PUBLICATIONS

Cho, H. et al., "A Multi-Sensor Fusion System for Moving Object Detection and Tracking in Urban Driving Environments," in Robotics and Automation (ICRA), 2014 IEEE International Conference on. IEEE, 2014, pp. 1836-1843.

Choi, J. et al., "Multi-Target Tracking Using a 3D-LiDAR Sensor for Autonomous Vehicles," in Intelligent Transportation Systems-(ITSC), 2013 16th International IEEE Conference on. IEEE, 2013, pp. 881-886.

Deo, N. et al., "Learning and Predicting On-Road Pedestrian Behavior around Vehicles," In Intelligent Transportation Systems (ITSC), 2017 20th International IEEE Conference on, IEEE,2017.

Doshi, A. et al., "Tactical Driver Behavior Prediction and Intent Inference: A Review," In Intelligent Transportation Systems (ITSC), 2011 14th International IEEE Conference on, pp. 1892-1897. IEEE, 2011.

Dueholm, J. V. et al., "Trajectories and Maneuvers of Surrounding Vehicles with Panoramic Camera Arrays," IEEE Transactions on Intelligent Vehicles, vol. 1, No. 2, pp. 203-214, 2016.

Hafner, M. R. et al., "Cooperative Collision Avoidance at Intersections: Algorithms and Experiments," IEEE Transactions on Intelligent Transportation Systems 14, No. 3 (2013): 1162-1175.

Hare, S. et al., "Struck: Structured Output Tracking with Kernels," IEEE Transactions on Pattern Analysis and Machine Intelligence, vol. 38, No. 10, pp. 2096-2109, 2016.

Hermes, C. et al., "Long-Term Vehicle Motion Prediction," In Intelligent Vehicles Symposium, 2009 IEEE, pp. 652-657. IEEE, 2009.

Hillenbrand, J. et al., "A Multilevel Collision Mitigation Approach Its Situation Assessment, Decision Making, and Performance Tradeoffs," IEEE Transactions on intelligent transportation systems 7, No. 4 (2006): 528-540.

Houenou, A. et al., "Vehicle Trajectory Prediction Based on Motion Model and Maneuver Recognition," In Intelligent Robots and Systems (IROS), 2013 IEEE/RSJ International Conference on, pp. 4363-4369. IEEE, 2013.

Huang, D. et al., "EM-IMM Based Land-Vehicle Navigation with GPS/INS," In Intelligent Transportation Systems, 2004. Proceedings. The 7th International IEEE Conference on, pp. 624-629. IEEE, 2004.

Joseph, J. M. et al., "A Bayesian Nonparametric Approach to Modeling Mobility Patterns," In Twenty-Fourth AAAI Conference on Artificial Intelligence. 2010.

Kaempchen, N. et al., "'IMM Object Tracking for High Dynamic Driving Maneuvers," In Intelligent Vehicles Symposium, 2004, pp. 825-830. IEEE, 2004.

Käfer, E. et al., "Recognition of Situation Classes at Road Intersections," In Robotics and Automation (ICRA), 2010 IEEE International Conference on, pp. 3960-3965. IEEE, 2010.

Kalal, Z. et al., "Tracking-Learning-Detection," IEEE Transactions on Pattern Analysis and Machine Intelligence, vol. 34, No. 7, pp. 1409-1422, 2012.

Khan, Z. et al., "An MCMC-Based Particle Filtering for Tracking a Variable Number of Interacting Targets," 2003, 15 pages.

Khosroshahi, A. et al., "Surround Vehicles Trajectory Analysis with Recurrent Neural Networks," In Intelligent Transportation Systems (ITSC), 2016 IEEE 19th International Conference on, pp. 2267-2272. IEEE, 2016.

Kim, S. et al., "Online Multi-Target Tracking by Large Margin Structured Learning," in Asian Conference on Computer Vision. Springer, 2012, pp. 98-111.

Kuo, C.-H. et al., "Multi-Target Tracking by On-Line Learned Discriminative Appearance Models," in Computer Vision and Pattern Recognition (CVPR), 2010 IEEE Conference on. IEEE, 2010, pp. 685-692.

Laugier, C. et al., "Probabilistic Analysis of Dynamic Scenes and Collision Risks Assessment to Improve Driving Safety," IEEE Intelligent Transportation Systems Magazine 3, No. 4 (2011): 4-19.

Lawitzky, A. et al., "Interactive Scene Prediction for Automotive Applications," In Intelligent Vehicles Symposium (IV), 2013, pp. 1028-1033. IEEE, 2013.

Li, Y. et al., "Learning to Associate: Hybridboosted Multi-Target Tracker for Crowded Scene," in Computer Vision and Pattern Recognition, 2009. CVPR 2009. IEEE Conference on. IEEE, 2009, pp. 2953-2960.

Mandalia, H. M. et al., "Using Support Vector Machines for Lane-Change Detection," In Proceedings of the Human Factors and Ergonomics Society Annual Meeting, vol. 49, No. 22, pp. 1965-1969. SAGE Publications, 2005.

Milan, A. et al., "Challenges of Ground Truth Evaluation of Multi-Target Tracking," in Proceedings of the IEEE Conference on Computer Vision and Pattern Recognition Workshops, 2013, pp. 735-742.

Milan, A et al., "Continuous Energy Minimization for Multitarget Tracking," IEEE Transactions on Pattern Analysis and Machine Intelligence, vol. 36, No. 1, pp. 58-72, 2014.

Morris, B. T. et al., "Trajectory Learning for Activity Understanding: Unsupervised, Multilevel, and Long-Term Adaptive Approach," IEEE Transactions on Pattern Analysis and Machine Intelligence 33, No. 11 (2011): 2287-2301.

Munkres, J. "Algorithms for the Assignment and Transportation Problems," Journal of the Society for Industrial and Applied Mathematics, vol. 5, No. 1, pp. 32-38, 1957.

Niebles, J. C. et al., "Efficient Extraction of Human Motion Volumes by Tracking," in Computer Vision and Pattern Recognition (CVPR), 2010 IEEE Conference on. IEEE, 2010, pp. 655-662.

Nilsson, J et al., "If, When, and How to Perform Lane Change Maneuvers on Highways," IEEE Intelligent Transportation Systems Magazine 8, No. 4 (2016): 68-78.

Oh, S. et al., "Markov Chain Monte Carlo Data Association for Multi-Target Tracking," IEEE Transactions on Automatic Control, vol. 54, No. 3, pp. 481-497, 2009.

Okuma, K. et al., "A Boosted Particle Filter: Multitarget Detection and Tracking," Computer Vision—ECCV 2004, pp. 28-39, 2004.

Osep, A. et al., "Multi-Scale Object Candidates for Generic Object Tracking in Street Scenes," in Robotics and Automation (ICRA), 2016 IEEE International Conference on. IEEE, 2016, pp. 3180-3187.

Pfeiffer, D. et al., "Efficient Representation of Traffic Scenes by Means of Dynamic Stixels," in Intelligent Vehicles Symposium (IV), 2010 IEEE. IEEE, 2010, pp. 217-224.

Pirsiavash, H. et al., "Globally-Optimal Greedy Algorithms for Tracking a Variable Number of Objects," in Computer Vision and Pattern Recognition (CVPR), 2011 IEEE Conference on. IEEE, 2011, pp. 1201-1208.

Polychronopoulos, A. et al., "Sensor Fusion for Predicting Vehicles' Path for Collision Avoidance Systems," IEEE Transactions on Intelligent Transportation Systems 8, No. 3 (2007): 549-562.

Rajaram, R. N. et al., "Refinenet: Refining Object Detectors for Autonomous Driving," IEEE Transactions on Intelligent Vehicles, vol. 1, No. 4, pp. 358-368, 2016.

Rangesh, A. et al., "A Multimodal, Full-Surround Vehicular Testbed for Naturalistic Studies and Benchmarking: Design, Calibration and Deployment," arXiv preprint arXiv:1709.07502, 2017.

Rangesh, A. et al., "No Blind Spots: Full-Surround Multi-Object Tracking for Autonomous Vehicles using Cameras & LiDARs," arXiv preprint arXiv:1802.08755, 2018.

Satzoda, R. K. et al., "Vision Based Front & Rear Surround Understanding Using Embedded Processors," IEEE Transactions on Intelligent Vehicles, vol. 1, No. 4, pp. 335-345, 2017.

Schlechtriemen, J. et al., "A Probabilistic Long Term Prediction Approach for Highway Scenarios," In Intelligent Transportation Systems (ITSC), 2014 IEEE 17th International Conference on, pp. 732-738. IEEE, 2014.

Schlechtriemen, J. et al., "When will it change the lane? A Probabilistic Regression Approach for Rarely Occurring Events," In Intelligent Vehicles Symposium (IV), 2015 IEEE, pp. 1373-1379. IEEE, 2015.

Schreier, M. et al., "Bayesian, Maneuver-Based, Longterm Trajectory Prediction and Criticality Assessment for Driver Assistance

(56) References Cited

OTHER PUBLICATIONS

Systems," In Intelligent Transportation Systems (ITSC), 2014 IEEE 17th International Conference on, pp. 334-341. IEEE, 2014.
Schubert, R. et al., "Comparison and Evaluation of Advanced Motion Models for Vehicle Tracking," In Information Fusion, 2008 11th International Conference on, pp. 730-735. IEEE, 2008.
Sivaraman, S. et al., "Dynamic Probabilistic Drivability Maps for Lane Change and Merge Driver Assistance," IEEE Transactions on Intelligent Transportation Systems, vol. 15, No. 5, pp. 2063-2073, 2014.
Sivaraman, S. et al., "Looking at Vehicles on the Road: A Survey of Vision-Based Vehicle Detection, Tracking, and Behavior Analysis," IEEE Transactions on Intelligent Transportation Systems, vol. 14, No. 4, pp. 1773-1795, 2013.
Sivaraman, S. et al., "Towards Cooperative, Predictive Driver Assistance," In Intelligent Transportation Systems—(ITSC), 2013 16th International IEEE Conference on, pp. 1719-1724. IEEE, 2013.
Song, S. et al., "Object Tracking with 3D LiDAR via Multitask Sparse Learning," in Mechatronics and Automation (ICMA), 2015 IEEE International Conference on. IEEE, 2015, pp. 2603-2608.
Song, X. et al., "Vision-Based Multiple Interacting Targets Tracking Via On-Line Supervised Learning," in European Conference on Computer Vision. Springer, 2008, pp. 642-655.
Tan, H-S. et al., "DGPS-Based Vehicle-To-Vehicle Cooperative Collision Warning: Engineering Feasibility Viewpoints," IEEE Transactions on Intelligent Transportation Systems 7, No. 4 (2006): 415-428.
Toledo-Moreo, R. et al., "IMM-Based Lane-Change Prediction in Highways with Low-Cost GPS/INS," IEEE Transactions on Intelligent Transportation Systems 10, No. 1 (2009): 180-185.
Tran, Q. et al., "Online Maneuver Recognition and Multimodal Trajectory Prediction for Intersection Assistance Using Non-Parametric Regression," In Intelligent Vehicles Symposium Proceedings, 2014 IEEE, pp. 918-923. IEEE, 2014.
Ulbrich, S. et al., "Towards Tactical Lane Change Behavior Planning for Automated Vehicles," In International Conference on Intelligent Transportation Systems (ITSC), 2015, pp. 989-995. IEEE, 2015.
Vasquez, D. et al., "Growing Hidden Markov Models: An Incremental Tool for Learning and Predicting Human and Vehicle Motion," The International Journal of Robotics Research 28, No. 11-12 (2009): 1486-1506.
Vasquez, D. et al., "Motion Prediction for Moving Objects: A Statistical Approach," In Robotics and Automation, 2004. Proceedings. ICRA'04. 2004 IEEE International Conference on, vol. 4, pp. 3931-3936. IEEE, 2004.
Vatavu, A. et al., "Stereovision-Based Multiple Object Tracking in Traffic Scenarios Using Free-Form Obstacle Delimiters and Particle Filters," IEEE Transactions on Intelligent Transportation Systems, vol. 16, No. 1, pp. 498-511, 2015.
Wiest, J. et al., "Probabilistic Trajectory Prediction with Gaussian Mixture Models," In Intelligent Vehicles Symposium (IV), pp. 141-146. IEEE, 2012.
Xiang, Y. et al., "Learning to Track: Online Multi-Object Tracking by Decision Making," in Proceedings of the IEEE International Conference on Computer Vision, 2015, pp. 4705-4713.
Zhang, L. et al., "Global Data Association for Multi-Tracking Using Network Flows," in Computer Vision and Pattern Recognition, 2008. CVPR 2008. IEEE Conference on. IEEE, 2008, pp. 1-8.

\* cited by examiner

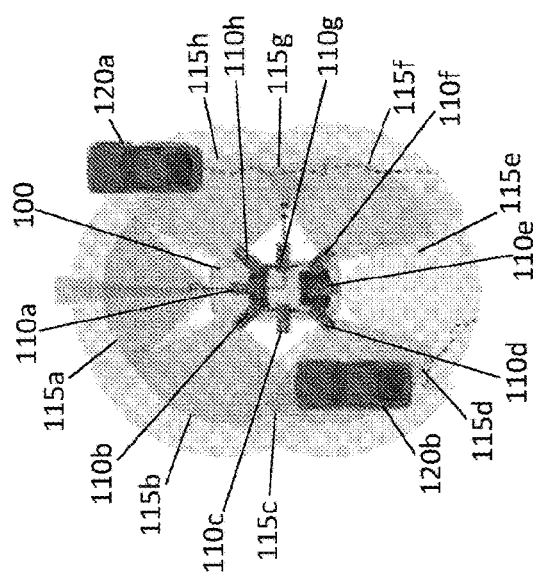 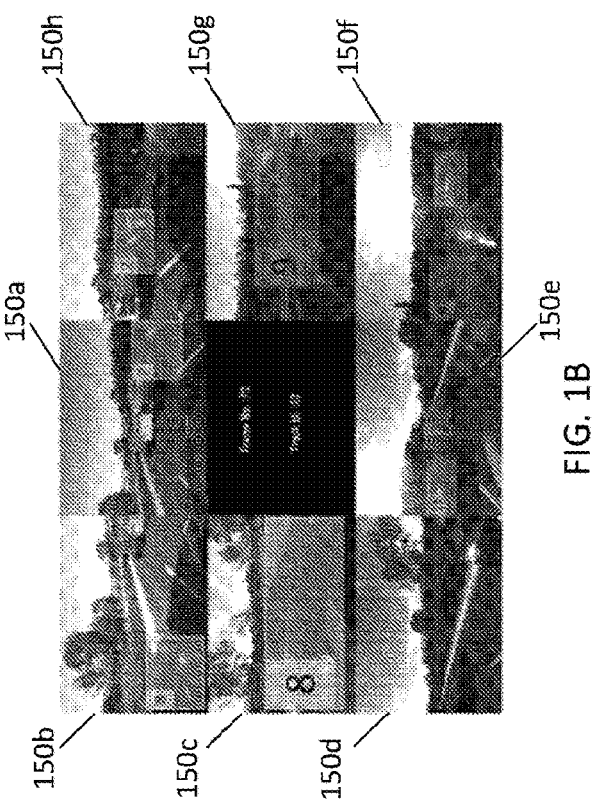
FIG. 1A
FIG. 1B

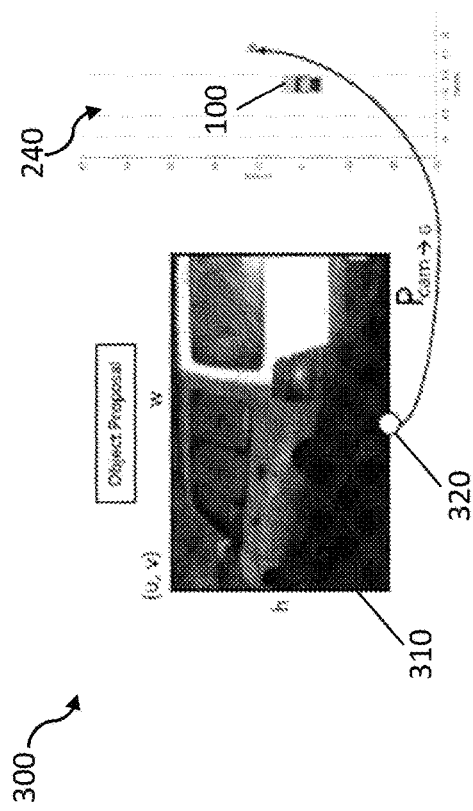
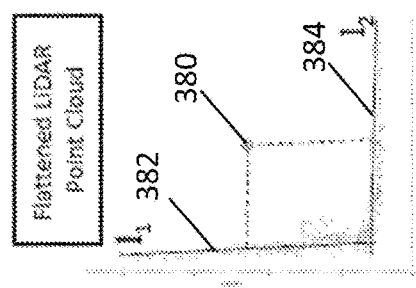
FIG. 3A
FIG. 3B

600

```
input : Set of multi-video sequences $\mathcal{V} = \{(v_i^1, \cdots, v_i^K)\}_{i=1}^N$,
        ground truth trajectories $\mathcal{T}_i = \{t_{ij}\}_{j=1}^{N_i}$, object proposals
        $\mathcal{D}_i = \{d_{im_i}\}_{m=1}^{M_i}$ and their corresponding projections for
        each multi-video sequence $(v_i^1, \cdots, v_i^K)$
output: Binary classifiers $\{(w_{Lost}^k, b_{Lost}^k)\}_{k=1}^K$ for data
        association
 1  repeat
 2    foreach multi-video sequence $(v_i^1, \cdots, v_i^K)$ in $\mathcal{V}$ do
 3      foreach target $t_{ij}$ do
 4        Initialize the MDP in an Active state;
 5        $l \leftarrow$ index of the first frame in which $t_{ij}$ is correctly
              detected;
 6        Transfer the MDP to a Tracked state and initialize
              the target template for each camera view in which
              target is observed;
 7        while $l \leq$ index of last frame of $t_{ij}$ do
 8          Fuse object proposals [    ]
 9          Follow the current policy and choose an action
              $a$;
10          Compute the action $a_{gt}$ according to the
              ground truth;
11          if current state is lost and $a \neq a_{gt}$ then
12            foreach camera view k in which the target
                has been seen do
13              Decide the label $y_{im_k}^k$ of the pair
                  $(t_{ij}^k, d_{im_k}^k)$;
14              $S^k \leftarrow S^k \cup \{(\phi(t_{ij}^k, d_{im_k}^k), y_{im_k})\}$;
15              $(w_{Lost}^k, b_{Lost}^k) \leftarrow$ [    ]
                  on $S^k$;
16            end
17            break;
18          else
19            Execute action $a$;
20            $l \leftarrow l + 1$;
21          end
22          if $l >$ index of last frame of $t_{ij}$ then
23            Mark target $t_{ij}$ as successfully tracked;
24          end
25        end
26      end
27    end
28  until all targets are successfully tracked;
```

FIG. 6

```
input  : A multi-video sequence (c¹,...,cᴷ), corresponding object
         proposals D = {dₘ}ᴹₘ₌₁ and their projections, learned binary
         classifier weights {(wᵏ_Active, bᵏ_Active)}ᴷₖ₌₁ and
         {(wᵏ_Lost, bᵏ_Lost)}ᴷₖ₌₁
output : Trajectories of targets T = {tⱼ}ᴺⱼ₌₁ in the sequence 1  foreach frame 1 in (c¹,...,cᴷ) do
 2      Fuse object proposals.
 3      /* process targets in tracked states */
 4      foreach tracked target tⱼ in T do
 5          Follow the policy, move the MDP of tⱼ to the next state.
 6      end
 7      /* process targets in lost states */
 8      foreach lost target tⱼ in T do
 9          foreach proposal dₘ not covered by any tracked target do
10              Compute
                f^{km}(tⱼ, dₘ) = (wᵏ_Lost)ᵀ φ(tⱼ, dₘ) + bᵏ_Lost
11          end
12      end
13      Data association with Hungarian algorithm for the lost targets.
14      Initialize target templates for uninitialized camera views using
        matched (fused) proposals.
15      foreach lost target tⱼ in T do
16          Follow the assignment, move the MDP of tⱼ to the next state.
17      end
18      /* initialize new targets */
19      foreach proposal dₘ not covered by any tracked target in T do
20          Initialize a MDP for a new target t with proposal dₘ.
21          if action a₁ is taken following the policy then
22              Transfer t to the tracked state and initialize the target
                templates for each camera views in which target is
                observed.
23              T ← T ∪ {t}.
24          else
25              Transfer t to the Inactive state.
26          end
27      end
28  end
```

FIG. 7

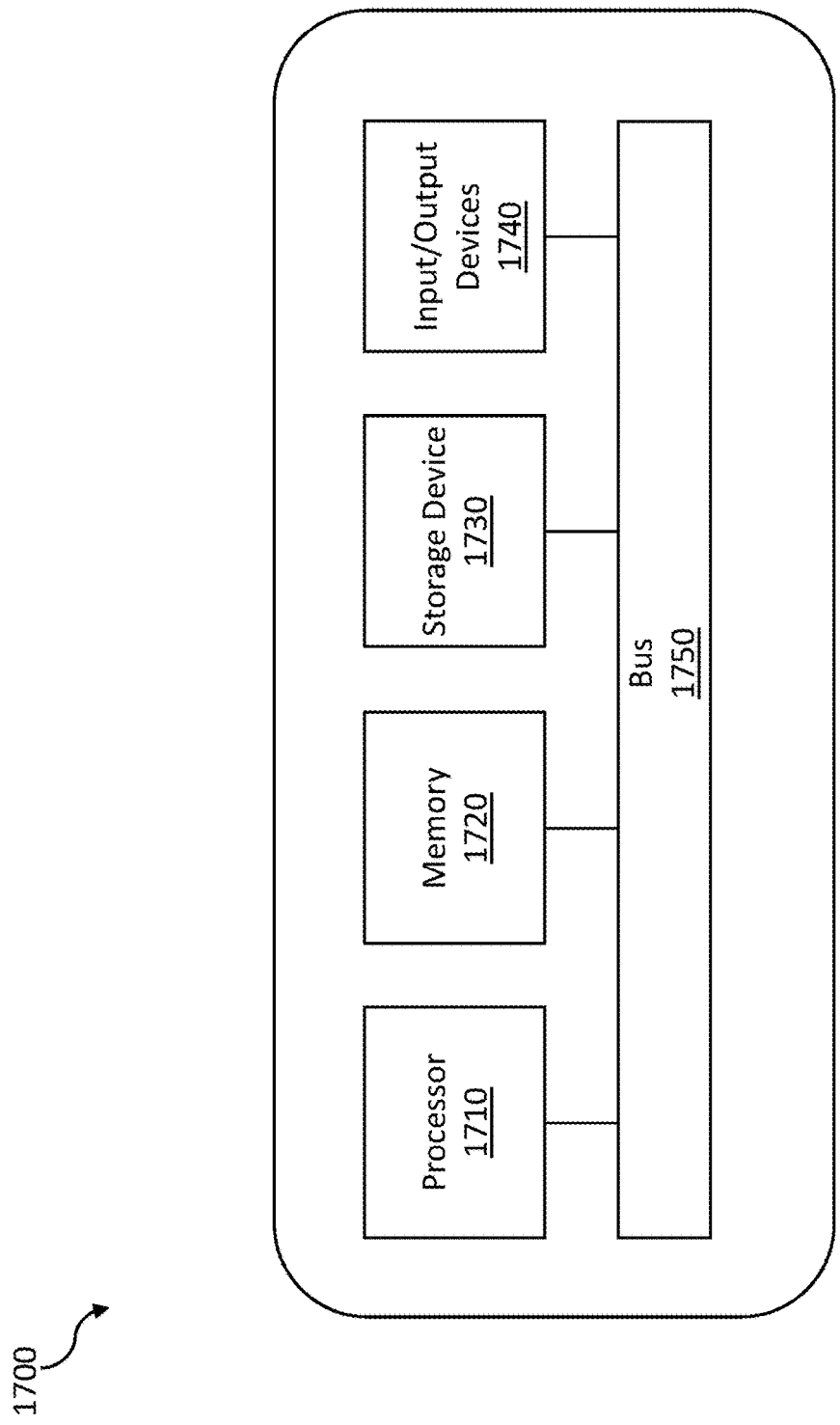

SURROUND VEHICLE TRACKING AND MOTION PREDICTION

CROSS-REFERENCE TO RELATED APPLICATION

This application is a national phase entry of Patent Cooperation Treaty Application No. PCT/US2019/012773 filed Jan. 8, 2019, entitled "SURROUND VEHICLE TRACKING AND MOTION PREDICTION," which claims priority to U.S. Provisional Patent Application No. 62/614,849 filed Jan. 8, 2018 and entitled "SURROUND VEHICLE TRACKING," the disclosures of both applications are incorporated herein by reference in their entirety.

FIELD

The present disclosure relates to tracking of objects in an environment surrounding a vehicle and to predicting motion of the tracked objects.

BACKGROUND

For successful deployment in challenging traffic scenarios, autonomous vehicles need to ensure the safety of its passengers and other occupants of the road, while navigating smoothly without disrupting traffic or causing discomfort to its passengers.

Tracking for autonomous vehicles involves accurately identifying and localizing dynamic objects in an environment surrounding the vehicle. Tracking of surround vehicles is essential for many tasks crucial to truly autonomous driving, such as obstacle avoidance, path planning, and intent recognition. To be useful for such high-level reasoning, the generated tracks are preferably accurate, long, and robust to sensor noise. Moreover, to safely share the road with human drivers, an autonomous vehicle preferably has the ability to predict the future motion of surrounding vehicles based on perception.

SUMMARY

Methods, systems, and articles of manufacture, including computer program products, are provided for a surround multi-object tracking framework and a surround vehicle motion prediction framework.

According to aspects of the current subject matter, a computer-implemented method includes: receiving, by a processing device and from one or more sensors positioned on a vehicle, data indicative of a detected object in an area at least partially surrounding the vehicle; fusing, by the processing device, object proposals of the detected object identified from the received data to form a fused object proposal such that the fused object proposal is representative of the detected object; generating, by the processing device, a track of the detected object, where the track is based on the fused object proposal and updated received data indicative of the detected object; determining, by the processing device, a maneuver class of the detected object, the maneuver class indicative of motion of the detected object and based on the generated track; determining, by the processing device, a plurality of future trajectories for the detected object, the plurality of future trajectories based on the generated track and at least one of a motion model and/or a probabilistic model; and determining, by the processing device, an expected future trajectory of the detected object based on the corresponding maneuver class and the plurality of future trajectories.

In an inter-related aspect, a system includes at least one data processor, and at least one memory storing instructions which, when executed by the at least one data processor, result in operations including: receiving, from one or more sensors positioned on a vehicle, data indicative of a detected object in an area at least partially surrounding the vehicle; fusing object proposals of the detected object identified from the received data to form a fused object proposal such that the fused object proposal is representative of the detected object; generating a track of the detected object, where the track is based on the fused object proposal and updated received data indicative of the detected object; determining a maneuver class of the detected object, the maneuver class indicative of motion of the detected object and based on the generated track; determining a plurality of future trajectories for the detected object, the plurality of future trajectories based on the generated track and at least one of a motion model and/or a probabilistic model; and determining an expected future trajectory of the detected object based on the corresponding maneuver class and the plurality of future trajectories.

In an inter-related aspect, a non-transitory computer-readable storage medium includes program code, which when executed by at least one data processor, causes operations including: receiving, by a processing device and from one or more sensors positioned on a vehicle, data indicative of a detected object in an area at least partially surrounding the vehicle; fusing, by the processing device, object proposals of the detected object identified from the received data to form a fused object proposal such that the fused object proposal is representative of the detected object; generating, by the processing device, a track of the detected object, where the track is based on the fused object proposal and updated received data indicative of the detected object; determining, by the processing device, a maneuver class of the detected object, the maneuver class indicative of motion of the detected object and based on the generated track; determining, by the processing device, a plurality of future trajectories for the detected object, the plurality of future trajectories based on the generated track and at least one of a motion model and/or a probabilistic model; and determining, by the processing device, an expected future trajectory of the detected object based on the corresponding maneuver class and the plurality of future trajectories.

In an inter-related aspect, an apparatus includes: means for receiving, from one or more sensors positioned on a vehicle, data indicative of a detected object in an area at least partially surrounding the vehicle; means for fusing object proposals of the detected object identified from the received data to form a fused object proposal such that the fused object proposal is representative of the detected object; means for generating a track of the detected object, where the track is based on the fused object proposal and updated received data indicative of the detected object; means for determining a maneuver class of the detected object, the maneuver class indicative of motion of the detected object and based on the generated track; means for determining a plurality of future trajectories for the detected object, the plurality of future trajectories based on the generated track and at least one of a motion model and/or a probabilistic model; and means for determining an expected future trajectory of the detected object proposal based on the corresponding maneuver class and the plurality of future trajectories.

In some variations, one or more of the features disclosed herein including the following features can optionally be included in any feasible combination. The received data may include: a video feed, from a plurality of cameras positioned on the vehicle, of the area at least partially surrounding the vehicle; and at least one point cloud, from at least one LiDAR sensor positioned on the vehicle, the at least one point cloud including LiDAR data associated with the area at least partially surrounding the vehicle. Fusing object proposals may include: projecting, by the processing device, the object proposals onto a global coordinate frame with respect to the vehicle; and combining, by the processing device and based on the projection of the object proposals, a subset of object proposals determined to belong to the detected object. Generating the track of the detected object may include: identifying, by the processing device, a status of the detected object; and identifying, by the processing device and if the status is an active status, a sequence of positions of the detected object based on the updated received data. The status of the detected object may be identified by a Markov Decision Process. The maneuver class of the detected object may be based on a Hidden Markov Model applied to a period of time of the generated track. Determining the plurality of future trajectories for the detected object may include: averaging, by the processing device, predicted future locations and covariances provided by the probabilistic model. The motion model may include a constant velocity motion model, a constant acceleration motion model, and a constant turn rate and velocity motion model. The expected future trajectory for the detected object may be based on a feasibility assessment of each of the plurality of future trajectories, where the feasibility assessment is based on a configuration of other detected objects within a predefined range of the vehicle. The processing device may generate an output.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1A is a diagram illustrating an exemplary vehicle with full-surround coverage for tracking multiple objects consistent with implementations of the current subject matter;

FIG. 1B includes exemplary images obtained from the full-surround vehicle of FIG. 1A;

FIG. 3A is a diagram illustrating aspects of projection of object proposals in a vision-only system consistent with implementations of the current subject matter;

FIG. 3B is a diagram illustrating aspects of projection of object proposals in a multi-sensor system consistent with implementations of the current subject matter;

FIG. 6 illustrates a policy learning algorithm consistent with implementations of the current subject matter;

FIG. 7 illustrates a three-dimensional multi-object tracking algorithm using Markov Decision Processes consistent with implementations of the current subject matter;

FIG. 17 depicts a block diagram illustrating a computing system consistent with implementations of the current subject matter.

Figure 2:
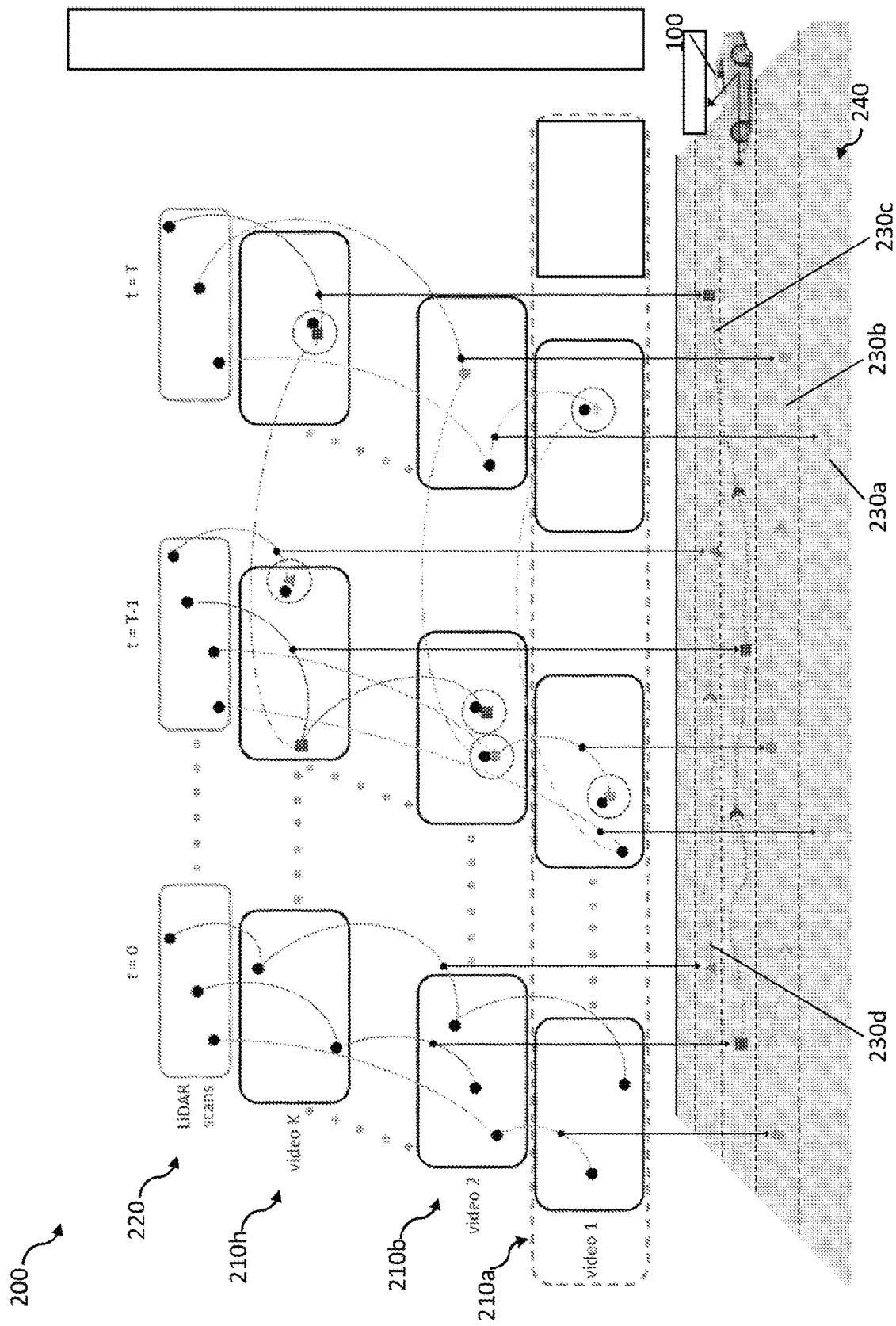
FIG. 2 is a block diagram representation of a tracking framework consistent with implementations of the current subject matter.

Like labels are used to refer to same or similar items in the drawings.

DETAILED DESCRIPTION

Aspects of the current subject matter relate to a surround, such as full-surround, multi-object tracking and surround vehicle motion prediction framework. In particular, a modular framework is provided that tracks multiple objects, such as vehicles, and that is capable of accepting object proposals from different sensor modalities including vision and range, and that incorporates a variable number of sensors to produce continuous object tracks. Consistent with implementations of the current subject matter, objects are tracked across multiple cameras and across different sensor modalities. Such tracking is done by accurately and efficiently fusing object proposals across sensors, as described in detail herein. Moreover, in implementations of the current subject matter, the objects of interest are tracked directly, which is a departure from traditional techniques in which objects are simply tracked in the image plane. This technique allows the tracks to be readily used by an autonomous agent for navigation and related tasks.

Moreover, aspects of the current subject matter provide for surround vehicle motion prediction based on data captured using vehicle mounted sensors. In particular, a unified framework for surround vehicle maneuver classification and motion prediction is provided that exploits multiple cues, including the estimated motion of vehicles, an understanding of typical motion patterns of freeway traffic, and inter-vehicle interaction.

A tracker consistent with implementations of the current subject matter performs surround, such as full-surround, multi-object tracking using calibrated camera arrays with varying degrees of overlapping fields of view. Additionally, range sensors for accurate localization of objects in three dimensions may be incorporated. The tracker described herein thus incorporates a multi-perspective, multi-modal, and multi-object tracking framework. The framework is trained and validated by using naturalistic driving data collected from a vehicle that has surround coverage from vision and range modalities consistent with implementations of the current subject matter, such as vehicle 100 shown in FIG. 1A.

In particular, the vehicle 100 has a plurality of cameras 110, each with a field of view 115, positioned on a surface of the vehicle 100. Shown in FIG. 1A are eight cameras 110$a,b,c,d,e,f,g,h$ with respective fields of view 115$a,b,c,d,e,f,g,h$, although the tracker framework consistent with implementations of the current subject matter is not limited to this number or the particular arrangement shown in FIG. 1A. For example, fewer or additional cameras may be incorporated, although the incorporation of fewer cameras may result in less accurate tracking results. Moreover, incorporating additional cameras may not be necessary and may provide redundant data at in increased cost. The cameras 110 shown in FIG. 1A may be equally spaced apart with respect to one another, or, in other implementations, the cameras 110 may be spaced apart at other prescribed angles. As shown in FIG. 1A, the cameras 110 are mounted on upper or top regions of the vehicle 100, with the corresponding fields of view 115 directed outward in the X-Y plane. Also shown in FIG. 1A is the overlap of adjacent fields of view. Two tracked objects 120$a,b$ are shown with tracked paths 125$a,b$, which are generated consistent with implementations of the current subject matter as further described herein.

FIG. 1B provides an example of images 150$a,b,c,d,e,f,g,h$ obtained at a discrete time from corresponding cameras 110$a,b,c,d,e,f,g,h$.

Two-dimensional multi-object tracking may incorporate a tracking-by-detection strategy, where object detections from a category detector are linked to form trajectories of the objects or targets. To perform tracking-by-detection online (in a causal fashion), the major challenge is to correctly associate noisy object detections in the current video frame with previously tracked objects. The basis for any data association algorithm is a similarity function between object detections and targets. To handle ambiguities in association, it is useful to combine different cues in computing the similarity, and learn an association based on these cues. Two-dimensional multi-object tracking may use some form of learning (online or offline) to accomplish data association. Implementations of the current subject matter utilize Markov Decision Processes (MDPs), where the lifetime of an object is modeled with a MDP, and multiple MDPs are assembled for multi-object tracking. In this method, learning a similarity function for data association is equivalent to learning a policy for the MDP. The policy learning is approached in a reinforcement learning fashion, which benefits from advantages of both offline-learning and online-learning in data association. The multi-perspective, multi-modal, and multi-object tracking framework consistent with implementations of the current subject matter is also capable to naturally handle the birth/death and appearance/disappearance of targets by treating them as state transitions in the MDP, and also benefits from the strengths of online learning approaches in single object tracking.

Consistent with implementations of the current subject matter, the traditional 2-D MDP formulation is extended and modified to track objects in 3-D. The tracking framework is capable of tracking objects across multiple vision sensors (e.g., cameras) in calibrated camera arrays by carrying out efficient and accurate fusion of object proposals. Moreover, the tracking framework, consistent with implementations of the current subject matter, is highly modular, capable of working with any number of cameras, with varying degrees of overlapping fields of view, and with the option to include range sensors for improved localization and fusion in 3-D.

According to aspects of the current subject matter, in addition to the camera arrays (e.g., the cameras 110$a,b,c,d,e,f,g,h$), LiDAR cloud points may also be utilized in the tracker framework to perform surround multi-object tracking. One or more LiDAR sensors may be positioned within the vehicle 100 and pointed outward to obtain the LiDAR cloud points. To effectively utilize all available sensors, an early fusion or reconciliation of object proposals obtained from each sensor is determined. At the start of each time step during tracking, all proposals belonging to the same object are identified and fused to form a fused object proposal representative of the object. The proposals are then utilized by the tracker framework to implement the tracking consistent with implementations of the current subject matter. This usage of the term "early fusion" is in contrast to the traditional usage of the term to refer to fusion of raw sensor data to provide a merged representation.

Aspects of the current subject matter provide a way of associating measurements from different sensors to track objects across different camera views, and to carry out efficient fusion across sensor modalities. This is achieved by defining a set of projection mappings, one from each sensor's unique coordinate system to the global coordinate system, and a set of back-projection mappings that take measurements in the global coordinate system to individual coordinate systems. The global coordinate system may be, for example, centered at a mid-point of the rear axle of the vehicle, such as the vehicle 100. The axes form a right-handed coordinate system as shown in FIG. 1A.

FIG. 2 depicts a block diagram representation of the tracking framework 200 that provides multi-perspective, multi-modal, and multi-object tracking consistent with implementations of the current subject matter. As shown, a plurality of video frames 210$a,b, \ldots, h$ (captured by the respective cameras 110$a,b, \ldots, h$) and a LiDAR scan 220 are provided for each tracked object at continuous time points. Data is associated not only within each video frame 210 but also across other videos and sensors (the LiDAR sensors). Tracks 230$a,b,c,d$ (a track for each tracked object) are produced in each individual sensor coordinate frame and in a desired global coordinate frame 240 using cross-modal fusion in an online manner, consistent with implementations of the current subject matter.

The LiDAR sensors output a 3-D point cloud in a common coordinate system at every instant. This coordinate frame may either be centered about a single LiDAR sensor, or elsewhere depending on the configuration. In some implementations, the projection and back-projection mappings are simple 3-D coordinate transformations:

$$P_{range \to G}(x^{range}) = R_{range} \cdot x^{range} + t_{range},$$

and, $$P_{range \leftarrow G}(x^G) = R_{range}^T \cdot x^G - R_{range}^T t_{range},$$

where $P_{range \to G}(\cdot)$ and $P_{range \leftarrow G}(\cdot)$ are the projection and back-projection mappings from the LiDAR (range) coordinate system to the global (G) coordinate system and vice-versa. The vectors $x^{range}$ and $x^G$ are the corresponding coordinates in the LiDAR and global coordinate frames. The 3×3 orthonormal rotation matrix $R_{range}$ and translation vector $t_{range}$ are obtained through calibration.

Similarly, the back-projection mappings for each camera $k \in \{1, \ldots, K\}$ can be defined as:

$$P_{cam_k \leftarrow G}(x^G) = (u, v)^T,$$

$$\text{s.t. } \begin{bmatrix} u \\ v \\ 1 \end{bmatrix} = C_k \cdot [R_k | t_k] \cdot [(x^G)^T | 1]^T,$$

where the set of camera calibration matrices $\{C_k\}_{k=1}^K$ are obtained after the intrinsic calibration of cameras, the set of tuples $\{R_k, t_k\}_{k=1}^K$ obtained after extrinsic calibration, and $(u, v)^T$ denotes the pixel coordinates after back-projection.

Unlike the back-projection mappings, the projection mappings for camera sensors are not well defined. In fact, the mappings are one-to-many due to the depth ambiguity of single camera images. To find a good estimate of the projection, two different approaches may be considered.

In case of a vision-only system, the inverse perspective mapping (IPM) approach may be utilized:

$$P_{cam_k \to G}(x^k) = (u, y)^T,$$

$$\text{s.t. } \begin{bmatrix} x \\ y \\ 1 \end{bmatrix} = H_k \cdot [(x^k)^T | 1]^T,$$

where $\{H_k\}_{k=1}^K$ are the set of homographies obtained after IPM calibration. As lateral and longitudinal displacements of vehicles in the global coordinate system are of concern, the $(x, y)^T$ coordinates are of interest, and the altitude coordinate may be set to a fixed number.

With a tracking-by-detection approach as described herein consistent with implementations of the current subject matter, each sensor is used to produce object proposals to track and associate. In case of vision sensors, a vehicle detector is run on each individual camera's image to obtain multiple detections d, each of which is defined by a bounding box in the corresponding image. Let (u, v) denote the top left corner and (w, h) denote the width and height of a detection d respectively.

In case of a vision-only system, the corresponding location of d in the global coordinate system is obtained using the mapping $$P_{cam_k \to G}\left(\left(u + \frac{w}{2}, v + h\right)^T\right),$$

where k denotes the camera from which the proposal was generated. This procedure is illustrated in diagram 300 of FIG. 3A, in which a bottom center point 320 of a bounding box 310 is projected into the global coordinate frame 240.

In cases where LiDAR sensors are available, an alternative is considered, as shown in diagram 350 of FIG. 3B, in which LiDAR points 370 that fall within a detection window 360 are flattened and lines $l_1$ 382 and $l_2$ 384 are fit to identify a center 380 of the tracked object/vehicle 365. First, the back-projected LiDAR points that fall within a detection box d are identified using a look-up table with pixel coordinates as the key, and the corresponding global coordinates as the value. These points are then flattened by ignoring the altitude component of their global coordinates. Next, a line $l_1$ is fitted to these points using RANSAC with a small inlier ratio (e.g., 0.3). This line aligns with the dominant side of the detected vehicle. The other side of the vehicle corresponding to line $l_2$ is then identified by removing all inliers from the previous step and repeating a RANSAC line fit with a slightly higher inlier ratio (e.g., 0.4). Finally, the intersection of lines $l_1$ and $l_2$ along with the vehicle dimensions yield the global coordinates of the vehicle center. The vehicle dimensions are calculated based on the extent of the LiDAR points along a given side of the vehicle, and stored for each track separately for later use.

Depending on the type of LiDAR sensors used, object proposals along with their dimensions in the real world may be obtained. However, according to some implementations, LiDAR proposals are not used, but rather the vision-only approach is utilized with high recall by trading off some of the precision. In some instances, this provides sufficient proposals to track surrounding vehicles, at the expense of more false positives than the tracker is capable of handling.

As the camera arrays have overlapping fields of view, the same vehicle or object may be detected in two adjacent views. It is important to identify and fuse such proposals to track objects across camera views. Aspects of the current subject matter provide two different approaches to carry out this fusion.

For vision-only systems, the fusion of proposals may be carried out in several steps, such as: i) Project proposals from all cameras to the global coordinate system using proposed mappings; ii) Sort all proposals in descending order based on their confidence scores (obtained from the vehicle detector); iii) Starting with the highest scoring proposal, find the subset of proposals whose Euclidean distance in the global coordinate system falls within a predefined threshold (these proposals are considered to belong to the same object and removed from the original set of proposals; in practice, a threshold of, for example, nm for grouping proposals may be used); and iv) The projection of each proposal within this subset is set to the mean of projections of all proposals within the subset. This process is repeated for the remaining proposals until no proposals remain.

Figure 4:
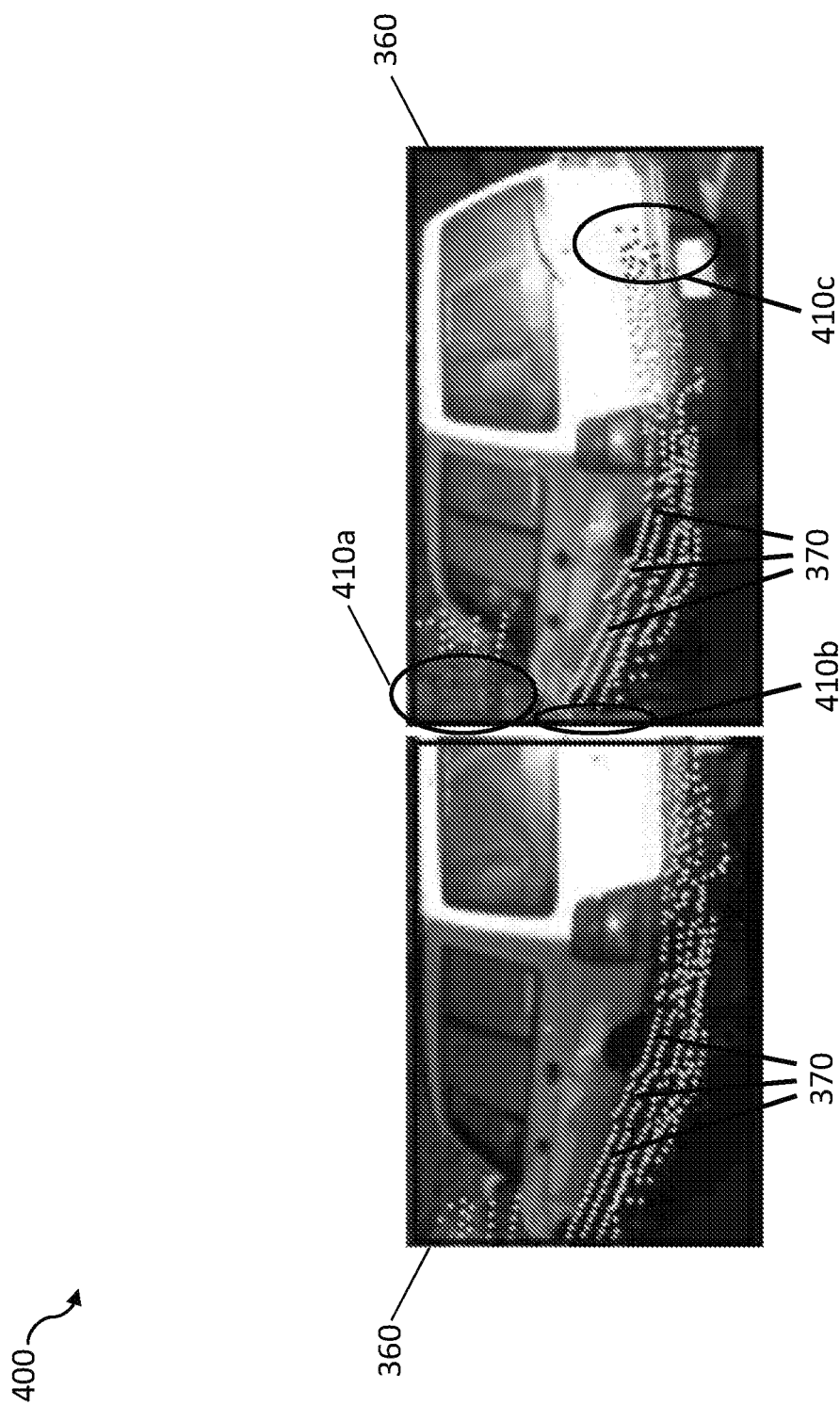
FIG. 4 is a diagram illustrating aspects of fusion of object proposals using LiDAR point clouds consistent with implementations of the current subject matter.

For a tracking system that includes LiDAR sensors, the 3-D point cloud onto each individual camera image is projected. Next, for each pair of proposals, a decision as to whether or not they belong to the same object is implemented. This is done by considering the back-projected LiDAR points that fall within the bounding box of each proposal. Diagram 400 of FIG. 4 illustrates fusion of object proposals using LiDAR point clouds. As shown, there are LiDAR points 370 that are common to both detections and those that are not (LiDAR points 410a, 410b, 410c).

$P_1$ and $P_2$ denote the index set of LiDAR points falling within each bounding box. Then, two proposals are said to belong to the same object if:

$$\max\left(\frac{\mathcal{P}_1 \cap \mathcal{P}_2}{|\mathcal{P}_1|}, \frac{\mathcal{P}_1 \cap \mathcal{P}_2}{|\mathcal{P}_2|}\right) \geq 0.8,$$

where $|P_1|$ and $|P_2|$ denote the cardinalities of sets $P_1$ and $P_2$ respectively. After fusion is completed, the union of LiDAR point sets that are back-projected into fused proposals may be used to obtain better projections. Additionally, values other than 0.8 may be used in the determination relating to the two proposals.

Figure 5:
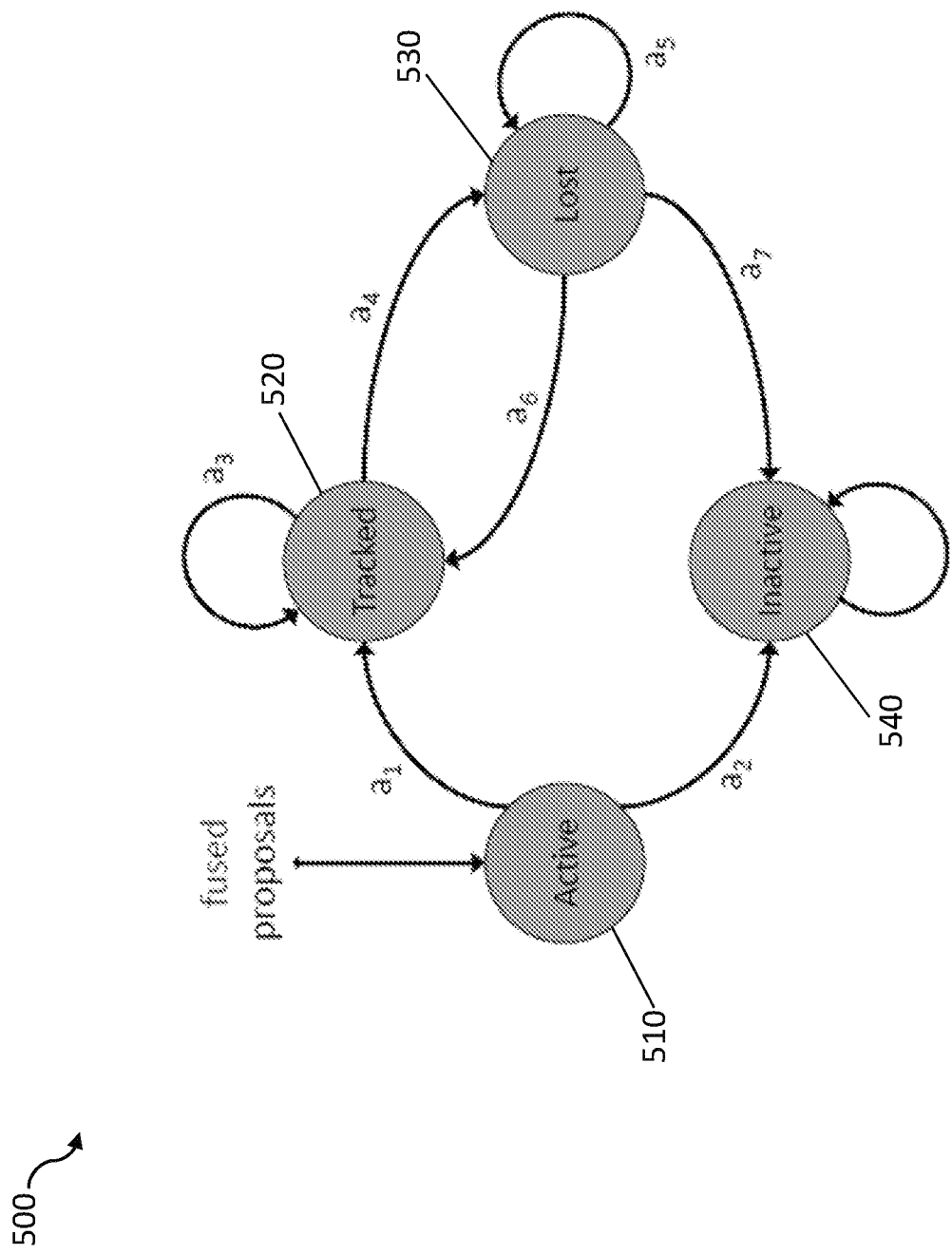
FIG. 5 is a diagram illustrating a Markov Decision Process framework consistent with implementations of the current subject matter

The set of fused object proposals are fed into the MDP. FIG. 5 illustrates a MDP framework 500 for use with the fused object proposals of the tracking system consistent with implementations of the current subject matter. The actions, rewards, and inputs of the MDP framework are modified to enable multi-sensory tracking. That is, the MDP framework is modified to account for multiple sensors and modalities.

Consistent with implementations of the current subject matter, the lifetime of a target is modeled with a MDP. The MDP has the tuple (S, A, T(•,•), R(•,•)), where: states s ε S encode the status of the target; actions a ε A define the actions that can be taken; the state transition function T:S×A↦ S dictates how the target transitions from one state to another, given an action; the real-valued reward function R:S×A↦ ℝ assigns the immediate reward received after executing action a in state s.

Consistent with implementations of the current subject matter, the state space is partitioned into four subspaces, $S=S_{Active}$ 510$\cup S_{Tracked}$ 520$\cup S_{Lost}$ 530$\cup S_{Inactive}$ 540, where each subspace 510, 520, 530, 540 contains infinite number of states which encode the information of the target depending on the feature representation, such as appearance, location, size and history of the target. FIG. 5 illustrates the transitions between the four subspaces. Active 510 is the initial state for any target. Whenever an object is detected by the object detector, it enters an active state 510. An active target can transition to tracked 520 or inactive 540. Ideally, a true positive from the object detector transitions to a tracked state 520, while a false alarm enters an inactive state 540. A tracked target can stay tracked 520, or transition to a lost state 530 if the target is not visible due to some reason, for example, occlusion or disappearance from sensor range. Similarly, a lost target can stay lost 530, or go back to a tracked state 520 if it appears again, or transition to an inactive state 540 if it has been lost for a sufficiently long time. Finally, inactive state 540 is the terminal state for any target; that is, in some implementations of the current subject matter, an inactive target stays inactive forever.

Consistent with implementations of the current subject matter, seven possible transitions are designed between the state subspaces 510, 520, 530, 540, which correspond to seven actions in the target MDP 500 as shown in FIG. 5. In the MDP, all the actions are deterministic (given the current state and an action, a new state for the target may be specified). For example, executing action a6 on a lost target transfers the target into a tracked state 520 (T($S_{Lot}$, a6)=$S_{Tracked}$).

The reward function is learned from training data. According to some aspects of the current subject matter, an inverse reinforcement learning problem in which ground truth trajectories of the targets as supervision is utilized.

In an active state 510, the MDP 500 makes the decision between transferring an object proposal into a tracked state 520 or inactive state 540 based on whether the detection is true or noisy. To do this, a set of binary Support Vector Machines (SVM) is trained offline, one for each camera view, to classify a detection belonging to that view into tracked 520 or inactive states 540 using a normalized 5D feature vector φActive(s) (2-D image plane coordinates, width, height, and score of the detection, where training examples are collected from training video sequences). This is equivalent to learning the reward function:

$$R_{Active}(s,a) = y(a)((w_{Active}^k)^T \cdot \phi_{Active}(s) + b_{Active}^k),$$

for an object proposal belonging to camera k∈{1, ..., K}. ($w_{active}^k$, $b_{active}^k$) defines the learned weights and bias of the SVM for camera k, y(a)=+1 if action a=$a_1$, and y(a)=−1 if a=$a_2$ (see FIG. 5). Training a separate SVM for each camera view allows weights to be learned based on object dimensions and locations in that particular view, and thus works better than training a single SVM for all views. Since a single object may result in multiple proposals, a tracker is initialized for that object if any of the fused proposals result in a positive reward. Note that a false positive from the object detector may still be misclassified and transferred to a tracked state, which is handled by the MDP in tracked and lost states.

In a tracked state 520, the MDP 500 needs to decide whether to keep tracking the target or to transfer it to a lost state 530. As long as the target is visible, it should continue to be tracked. Otherwise, it should be marked "lost". An appearance model for the target is built online and is used to track the target. If the appearance model is able to successfully track the target in the next video frame, the MDP 500 leaves the target in a tracked state 520. Otherwise, the target is transferred to a lost state 530.

The appearance of the target is represented by a template that is an image patch of the target in a video frame. When an object detection is transferred to a tracked state 510, the target template with the detection bounding box is initialized. If the target is initialized with multiple fused proposals, then each detection is stored as a template. Detections obtained from different camera views are noted and used to model the appearance of the target in that view. This is crucial to track objects across camera views under varying perspective changes. When the target is being tracked, the MDP 500 collects its templates in the tracked frames to represent the history of the target, which will be used in the lost state 530 for decision making.

In implementations of the current subject matter, tracking of templates is carried out by performing dense optical flow. The stability of the tracking may be measured using the median of the Forward-Backward (FB) errors of all sampled points:

$$e_{medFB} = \text{median}(e(u_i)_{i=1}^n)$$

where $u_i$ denotes each sampled point, and n is the total number of points. If $e_{medFB}$ is larger than some threshold, the tracking is considered to be unstable. Moreover, after filtering out unstable matches whose FB error is larger than the threshold, a new bounding box of the target is predicted using the remaining matches by measuring scale change between points before and after. This process is carried out for all camera views in which a target template has been initialized and tracking is in progress.

Consistent with implementations of the current subject matter, the optical flow information is used in addition to the object proposals history to prevent drifting of the tracker. To do this, the bounding box overlap between the target box for 1 past frames is computed, and the corresponding detections in each of those frames. Then the mean bounding box overlap for the past L tracked frames ° mean is computed as another cue to make the decision. Once again, this process is repeated for each camera view in which the target is being tracked. In addition to the above features, gate the target track is gated. This involves introducing a check to see if the current global position of the tracked target falls within a window (gate) of its last known global position. This forbids the target track from latching onto objects that appear close on the image plane, yet are much farther away in the global coordinate frame. The last know global position and the currently tracked global position of the target is denoted as $x^G(t-1)$ and $\hat{x}^G(t)$, respectively.

The reward function in a tracked state s is defined using the feature set $\phi_{Tracked}(S)=$ $$\phi_{Tracked}(s) = \left(\{e^{k'}_{medFB}\}_{k'=1}^{K'}, \{o^{k'}_{mean}\}_{k'=1}^{K'}, x^G(t-1), \hat{x}^G(t)\right) \text{ as:}$$

$$R_{Tracked}(s, a) = \begin{cases} y(a), & \text{if } \exists k' \in \{1, \ldots, K'\} \text{ s.t.} \\ & (e^{k'}_{medFB} < e_\theta) \wedge (o^{k'}_{mean} > a_0) \\ & \wedge (|x^G(t-1) - \hat{x}^G(t)| \le t_{gate}), \\ -y(a), & \text{otherwise}, \end{cases}$$

where $e_0$ and $o_0$ are fixed thresholds, $y(a)=+1$ if action $a=a_3$, and $y(a)=-1$ if $a=a_4$ (see FIG. 5). k' above indexes camera views in which the target is currently being tracked and $t_{gate}$ denotes the gating threshold. Thus, the MDP 500 keeps the target in a tracked state 510 if $e_{medFB}$ is smaller and $o_{mean}$ is larger than their respective thresholds for any one of K' camera views in addition to satisfying the gating check. Otherwise, the target is transferred to a lost state 530.

The appearance model of the target needs to be regularly updated in order to accommodate appearance changes. A "lazy" updating rule is adopted and resorted to the object detector in preventing tracking drift. This is done so that tracking errors are not accumulated, but rather rely on data association to handle appearance changes and continue tracking. In addition to this, templates are initialized in views where the target is yet to be tracked by using proposals that are fused with detections corresponding to the tracked location in an adjacent camera view. This helps track objects that move across adjacent camera views, by creating target templates in the new view as soon as they are made available.

In a lost state 530, the MDP 500 needs to decide whether to keep the target in a lost state 530, transition it to a tracked state 520, or mark it as inactive 540. According to aspects of the current subject matter, a lost target is marked as inactive 540 and the tracking is terminated if the target is lost for more than Lust frames. The decision between tracking the target and keeping it as lost is treated as a data association problem where, in order to transfer a lost target into a tracked state 520, the target needs to be associated with an object proposal, else, the target retains its lost state.

With respect to data association, t denotes a lost target and d is an object detection. The goal of data association is to predict the label $y \in \{+1, -1\}$ of the pair (t, d) indicating that the target is linked (y=+1) or not linked (y=-1) to the detection. Assuming that the detection d belongs to camera view k, this binary classification is performed using the real-valued linear function:

$$f^k(t,d) = (w_{Lost}^k)^T \cdot \phi_{Lost}(t,d) + b_{Lost}^k$$

where $(w_{lost}^k, b_{lost}^k)$ are the parameters that control the function (for camera view k), and $\phi_{Lost}(t, d)$ is the feature vector which captures the similarity between the target and the detection.

The decision rule is given by y=+1 if $f^k(t, d) \ge 0$, else y=-1. Consequently, the reward function for data association in a lost states given the feature set:

$$\{\phi_{Lost}(t,d_j)\}_{m=1}^M$$

is defined as:

$$R_{Last}(s, a) = y(a)\left(\max_{m=1}^M \left((w_{Lost}^{km})^T \cdot \phi_{Lost}(t, d_m) + b_{Lost}^{km}\right)\right)$$

where $y(a)=+1$ if action $a=a_6$, $y(a)=-1$ if $a=a_5$ (see FIG. 5), and m indexes M potential detections for association. Potential detections for association with a target are obtained by applying a gating function around the last known location of the target in the global coordinate system. Based on which camera view each detection $d_m$ originates from, the appropriate weights $(w_{lost}^{km}, b_{lost}^{km})$ associated with that view are used. As a result, the task of policy learning in the lost state 530 reduces to learning the set of parameters $\{(w_{lost}^k, b_{lost}^k)\}_{k=1}^k$ for the decision functions $\{f^k(t, d)\}_{k=1}^K$.

Consistent with implementations of the current subject matter, the binary classifiers described above are trained using a reinforcement learning paradigm. $V=\{(v_i^1, \ldots, v_i^K)\}_{i=1}^N$ denotes a set of multi-video sequences for training, where N is the number of sequences and K is the total number of camera views. There are $N_i$ ground truth targets $T_i=\{t_{ij}\}_{j=1}^{N_i}$ in the multi-video sequence $(v_i^1, \ldots, v_i^K)$. The MDP is trained to successfully track all these targets across all camera views in which they appear. Training starts with initial weights $(w_0^k, b_0^k)$ and an empty training set $S_0^k=\emptyset$ for the binary classifier corresponding to each camera view k. When the weights of the binary classifiers are specified, there is a complete policy for the MDP to follow. The training algorithm loops over all the multi-video sequences and all the targets, and follows the current policy of the MDP to track the targets. The binary classifier or the policy is updated only when the MDP makes a mistake in data association. In this case, the MDP takes a different action than what is indicated by the ground truth trajectory. Suppose the MDP is tracking the $j^{th}$ target $t_{ij}$ in the video $v_i^k$, and on the $l^{th}$ frame of the video, the MDP is in a lost state 530. Consider the two types of mistakes that can happen: i) The MDP associates the target $t_{ij}^k(l)$ to an object detection $d_m^k$ which disagrees with the ground truth (the target is incorrectly associated to a detection). Then $\phi(t_{ij}^k t(l), d_m^k)$ is added to the training set $S^k$ of the binary classifier for camera k as a negative example; ii) The MDP decides to not associate the target to any detection, but the target is visible and correctly detected by a detection $d_m^k$ based on the ground truth (the MDP missed the correct association). Then $\phi(t_{ij}^k(l), d_m^k)$ is added to the training set as a positive example. After the training set has been augmented, the binary classifier is updated by re-training it on the new training set. Specifically, given the current training set $S^k=\{\phi(t_m^k, d_m^k), y_m^k\}_{m=1}^M$, the following soft-margin optimization problem is solved to obtain a max-margin classifier for data association in camera view k:

$$\min_{w_{Lost}^k, b_{Lost}^k, \xi} \frac{1}{2} \|w_{Lost}^k\|^2 + C \sum_{m=1}^{M} \xi_m$$

$$\text{s.t. } y_m^k((w_{Lost}^k)^T \cdot \phi(t_m^k, d_m^k) + b_{Lost}^k) \geq 1 - \xi_m, \xi_m \geq 0, \forall m$$

where $\xi=1, \ldots, M$ are the slack variables, and C is a regularization parameter. Once the classifier is updated, a new policy is obtained which is used in the next iteration of the training process. Based on which view the data association is carried out in, the weights of the classifier in that view are updated in each iteration. The policy is iterated and updated until all the targets are successfully tracked. FIG. 6 includes algorithm 600 which summarizes the policy teaming algorithm.

Two features are added based on the lateral and longitudinal displacements of the last known target location and the object proposal location in the global coordinate system. This leverages 3-D information that is otherwise unavailable in 2-D multi-object tracking. Table 1 summarizes the feature representation consistent with implementations of the current subject matter.

TABLE 1

| Type | Notation | Feature Description |
| --- | --- | --- |
| FB error | $\phi_1, \ldots, \phi_5$ | Mean of the median forward-backward errors from the entire, left half, right half, upper half and lower half of the templates obtained from optical flow |
| NCC | $\phi_6$ | Mean of the median Normalized Correlation Coefficients (NCC) between image patches around the matched points in optical flow |
|  | $\phi_7$ | Mean of the median Normalized Correlation Coefficients (NCC) between image patches around the matched points obtained from optical flow |
| Height ratio | $\phi_8$ | Mean of ratios of the bounding box height of the detection to that of the predicted bounding boxes obtained from optical flow |
|  | $\phi_9$ | Ratio of the bounding box height of the target to that of the detection |
| Overlap | $\phi_{10}$ | Mean of the bounding box overlaps between the detection and the predicted bounding boxes from optical flow |
| Score | $\phi_{11}$ | Normalized detection score |
| Distance | $\phi_{12}$ | Euclidean distance between the centers of the target and the detection after motion prediction of the target with a linear velocity model |
|  | $\phi_{13}$ | Lateral offset between last known global coordinate position of the target and that of the detection |
|  | $\phi_{14}$ | Longitudinal offset between last known global coordinate position of the target and that of the detection |

After learning the policy/reward of the MDP, it is applied to the multi-object tracking problem. One MDP is dedicated for each target, and the MDP follows the learned policy to track the object. Given a new input video frame, targets in tracked states are processed first to determine whether they should stay as tracked or transfer to lost states. Then pairwise similarity is computed between lost targets and object detections which are not covered by the tracked targets, where non-maximum suppression based on bounding box overlap is employed to suppress covered detections, and the similarity score is computed by the binary classifier for data association. After that, the similarity scores are used in the Hungarian algorithm (also known as the Kuhn-Munkres algorithm), for example, to obtain the assignment between detections and lost targets. According to the assignment, lost targets which are linked to some object detections are transferred to tracked states. Otherwise, they stay as lost. Finally, a MDP is initialized for each object detection which is not covered by any tracked target. FIG. 7 includes algorithm 700 which summarizes the 3-D multi-object tracking algorithm using MDPs in detail. Note that tracked targets have higher priority than lost targets in tracking, and detections covered by tracked targets are suppressed to reduce ambiguities in data association.

Experimental analysis was performed to validate the multi-object tracking aspects of the current subject matter described herein and with reference to FIGS. 1-7. A setup as shown in FIG. 1A, with full-surround vision sensors (cameras 110$a,b,c,d,e,f,g,h$), ensures full surround coverage of the scene around the vehicle 100, while retaining a sufficient overlap between adjacent camera views. In addition to full vision coverage, the experimental setup included full-surround Radar and LiDAR fields of view. Cases in which only a subset of the vision sensors are used are also considered to illustrate the modularity of the approach.

To train and test the experimental 3-D multi-object tracking system, a set of four sequences, each three to four minutes long, including multi-camera videos and LiDAR point clouds was collected. The sequences chosen are much longer than traditional multi-object tracking sequences so that long range maneuvers of surround vehicles can be tracked. This is very crucial to autonomous driving. All vehicles in the eight camera videos for each sequence are annotated with their bounding box, as well as track identifiers. Each unique vehicle in the scene is assigned the same ID in all camera views. With these sequences set up, one sequence is used for training the tracker, and the rest are reserved for testing.

In the experimental analysis, the following metrics were evaluated: Multiple Object Tracking Accuracy (MOTA), Multiple Object Tracking Precision (MOTP), Mostly Track targets (MT, percentage of ground truth objects whose trajectories are covered by the tracking output for at least 80%), Mostly Lost targets (ML, percentage of ground truth objects whose trajectories are covered by the tracking output less than 20%), and the total number of ID Switches (IDS).

Figure 8:
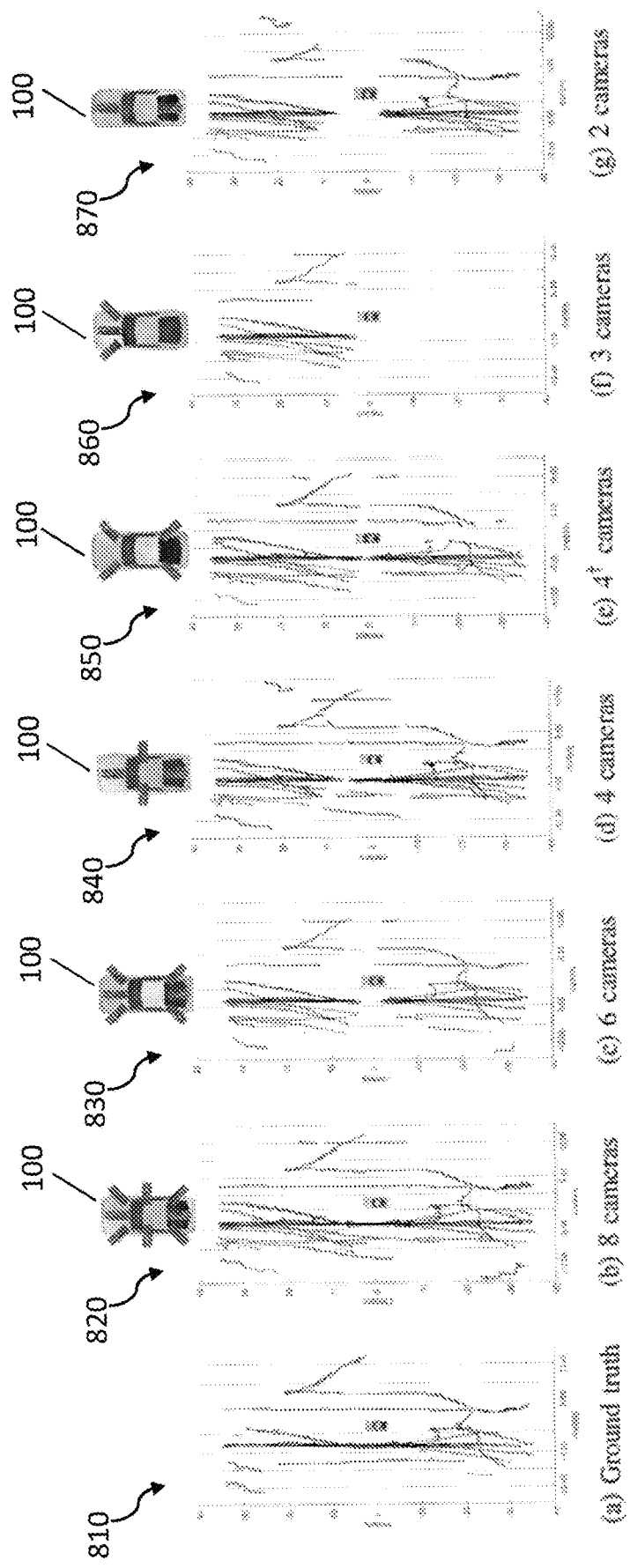
FIG. 8 is a diagram illustrating top-down visualizations of ground truth tracks and generated tracks for a test sequence for a tracker consistent with implementations of the current subject matter.

The tracker consistent with implementations of the current subject matter was tested with different camera configurations: 2, 3, 4, 6, and 8 cameras. FIG. 8 provides top-down visualizations 810, 820, 830, 840, 850, 860, and 870 of ground truth tracks and generated tracks for a test sequence. The ground truth tracks (810) are provided for visual comparison. As can be seen, the tracker provides consistent results in its field of view irrespective of the camera configuration used, even if the cameras have no overlap between them.

The quantitative results on the test set for each camera configuration are listed below in Table 2. The tracker for each configuration is scored based on the ground truth tracks visible in that camera configuration. The tracker is seen to score very well on each metric, irrespective of the number of cameras used. This illustrates the robustness of the proposed tracker framework described herein. Of importance is that the tracker performs exceptionally well in the MT and ML metrics, especially in camera configurations with overlapping fields of view. The tracker mostly tracks more than 70% of the targets, while mostly losing only a few, demonstrating the long-term target tracking capability.

TABLE 2

| Criteria for Comparison | Tracker Variant | Sensor Configuration | | MOT Metrics | | | | |
|---|---|---|---|---|---|---|---|---|
| | | # of Cameras | Range Sensors | MOTA (↑) | MOTP (↓) | MT(↑) | ML(↓) | IDS(↓) |
| Number of Cameras Used | — | 2 | ✓ | 73.38 | 0.03 | 71.36% | 16.13% | 16 |
| | — | 3 | ✓ | 77.26 | 0.03 | 77.34% | 14.49% | 38 |
| | — | 4 | ✓ | 72.81 | 0.05 | 72.48% | 20.76% | 49 |
| | — | 4† | ✓ | 74.18 | 0.05 | 74.10% | 18.18% | 45 |
| | — | 6 | ✓ | 79.06 | 0.04 | 79.66% | 11.93% | 51 |
| | — | 8 | ✓ | 75.10 | 0.04 | 70.37% | 14.07% | 59 |
| Projection Scheme | Point closed bosed projection | 8 | ✓ | 75.10 | 0.04 | 70.37% | 14.07% | 59 |
| | IPM projection | 8 | ✓(for fusion) | 47.45 | 0.39 | 53.70% | 19.26% | 152 |
| Fusion Scheme | Point cloud based fusion | 8 | ✓ | 75.10 | 0.04 | 70.37% | 14.07% | 59 |
| | Distance based fusion | 8 | ✓(for projection) | 72.20 | 0.04 | 68.23% | 12.23% | 65 |
| Sensor Modality | Camera + LiDAR | 8 | ✓ | 75.10 | 0.04 | 70.37% | 14.07% | 59 |
| | Cameras | 8 | x | 40.98 | 0.40 | 50.00% | 27.40% | 171 |
| Vehicle Detector | RefineNet | 8 | ✓ | 75.10 | 0.04 | 70.37% | 14.07% | 59 |
| | RetinaNet | 8 | ✓ | 73.89 | 0.05 | 68.37% | 17.07% | 72 |
| Global Position based Features | Sub Cat | | 8 | ✓ | 69.93 | 0.04 | 66.67% | 22.22% | 81 |
| | with {$\phi_{13}, \phi_{14}$} | 8 | ✓ | 75.10 | 0.04 | 70.37% | 14.07% | 59 |
| | without{$\phi_{13}, \phi_{14}$} | 8 | ✓ | 71.32 | 0.05 | 64.81% | 17.78% | 88 |

Figure 9:
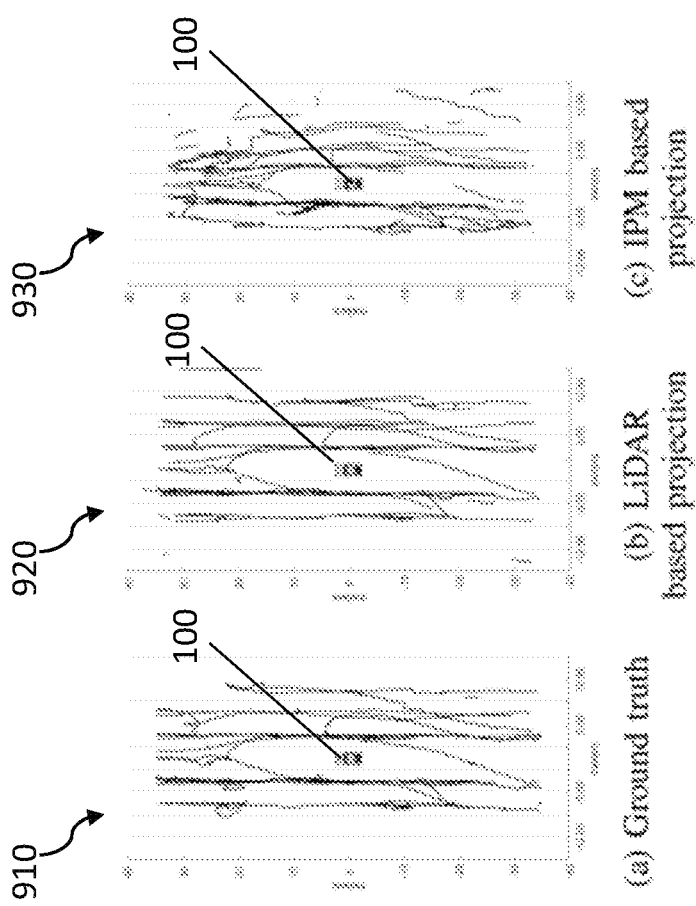
FIG. 9 is a diagram illustrating tracking results for a test sequence using projection schemes consistent with implementations of the current subject matter.

FIG. 9 illustrates tracking results 920 and 930 for a test sequence using projection schemes consistent with implementations of the current subject matter. Ground truth tracking 910 is also provided for comparison. As shown, the LiDAR-based projection (920) results in much better localization in 3-D, leading to more stable tracks and fewer fragments. The IPM-based projection scheme is very sensitive to small changes in the input domain, leading to considerable errors during gating and data association. This phenomenon is verified by the high MOTP value obtained for IPM based projection as listed in Table 2.

The LiDAR point cloud-based fusion scheme is more reliable in comparison to the distance based approach, albeit this difference is much less noticeable when proposals are projected using LiDAR point clouds. The LiDAR-based fusion scheme results in objects being tracked longer (across camera views) and more accurately. The distance based fusion approach on the other hand fails to associate certain proposals, resulting in templates not being stored for new camera views, thereby cutting short the track as soon as the target exits the current view. This is reflected in the quantitative results shown in Table 2. The drawbacks of the distance based fusion scheme are exacerbated when using IPM to project proposals, reflected by the large drop in MOTA for a purely vision based system. This drop in performance is to be expected in the absence of LiDAR sensors. However, it must be noted that half the targets are still tracked for most of their lifetime, while only a quarter of the targets are mostly lost.

Additional experimental analysis was done to observe how the tracking results change for different vehicle detectors. The proposed tracker algorithm was run on vehicle detections obtained from three commonly used object detectors. The corresponding tracking results for each detector are listed in Table 2 (shown above). Despite the sub-optimal performance of all three detectors, the tracking results are seen to be relatively unaffected. This indicates that the tracker is less sensitive to errors made by the detector and consistently manages to correct for it.

Table 2 indicates a clear benefit in incorporating features {$\phi_{13}, \phi_{14}$} for data association in lost states. These features express how near/far a proposal is from the last know location of a target. This helps the tracker disregard proposals that are unreasonably far away from the latest target location. Introduction of these features leads to an improvement in all metrics and therefore justifies their inclusion.

Consistent with additional implementations of the current subject matter, and to address the problem of surround vehicle motion prediction based on data captured using vehicle mounted sensors (cameras 110a,b,c,d,e,f,g,h), a framework for holistic surround vehicle trajectory prediction is provided and is based on three interacting modules: a hidden Markov model (HMM) based maneuver recognition module for assigning confidence values for maneuvers being performed by surround vehicles, a trajectory prediction module based on the amalgamation of an interacting multiple model (IMM) based motion model and maneuver specific variational Gaussian mixture models (VGMMs), and a vehicle interaction module that considers the global context of surround vehicles and assigns final predictions by minimizing an energy function based on outputs of the other two modules.

Figure 10:
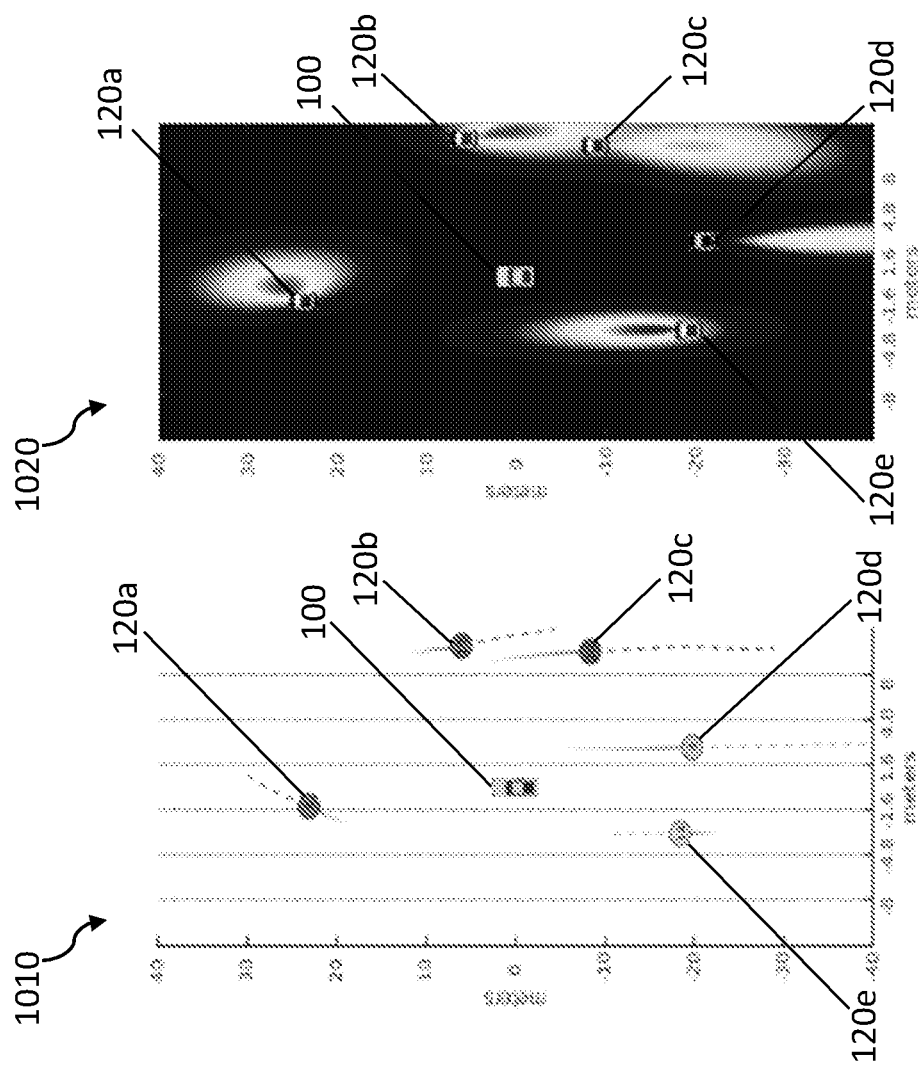
FIG. 10 is a diagram illustrating mean predicted trajectories and a heat map of predicted distribution consistent with implementations of the current subject matter.

Consistent with implementations of the current subject matter, FIG. 10 illustrates mean predicted trajectories 1010 and a heat map 1020 of predicted distribution in the ground plane with respect to the data captured as shown in FIG. 1B (the images 150a,b,c,d,e,f,g,h obtained at a discrete time from corresponding cameras 110a,b,c,d,e,f,g,h).

Figure 11:
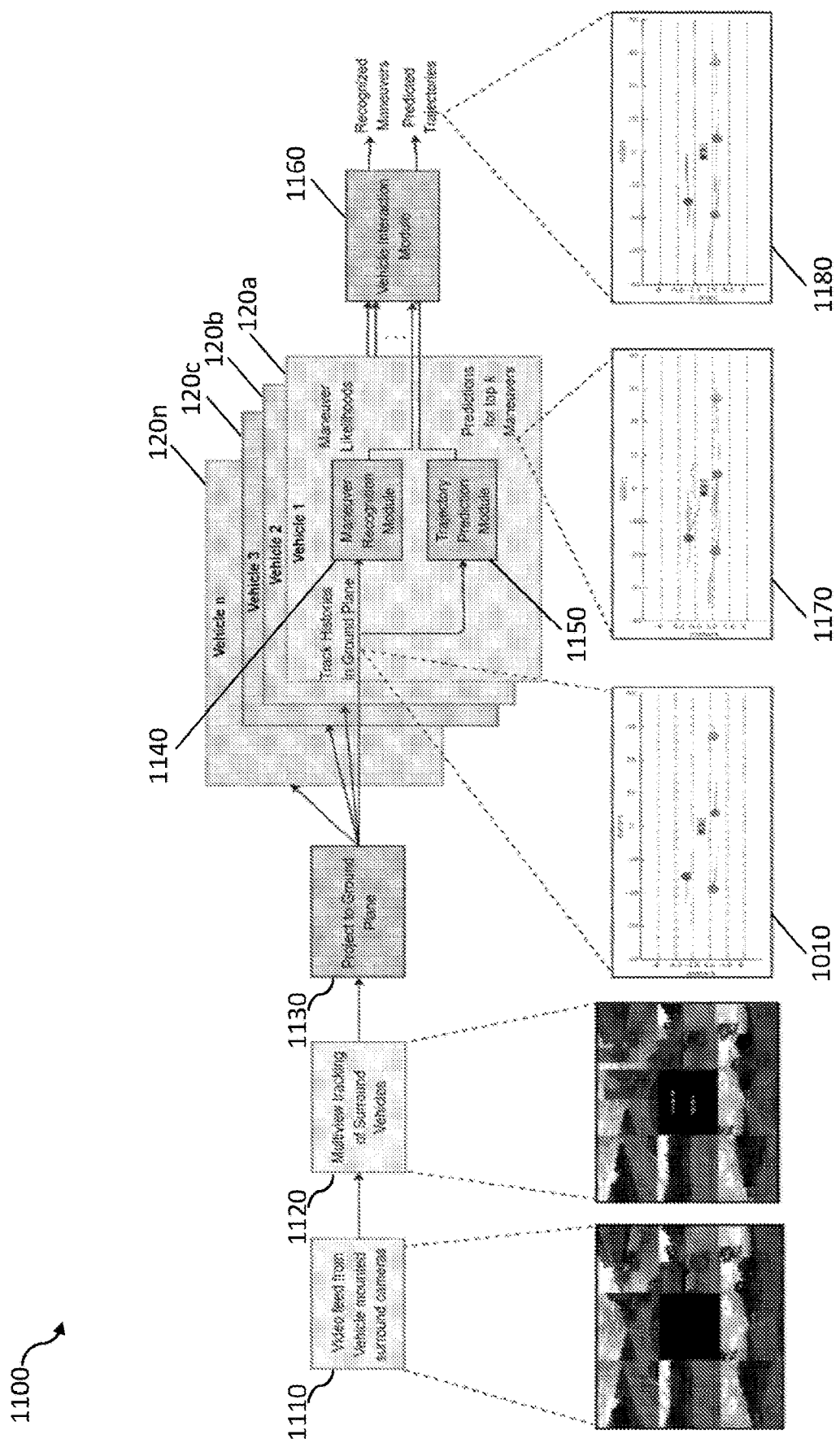
FIG. 11 is a block diagram representation of a motion prediction framework consistent with implementations of the current subject matter.

FIG. 11 is a block diagram representation of a motion prediction framework 1100 consistent with implementations of the current subject matter. The framework is restricted to perception based prediction of surround vehicle motion, without any vehicle to vehicle communication. According to some aspects of the current subject matter, the vehicle 100 may be equipped with eight cameras 110a,b,c,d,e,f,g,h to capture full-surround. Vehicles within 40 m of the vehicle 100 in the longitudinal direction may be tracked for motion analysis and prediction. As described elsewhere herein, the tracked vehicle locations are projected to the ground plane to generate track histories of the surround vehicles in the frame of reference of the vehicle 100.

As shown in FIG. 11, video feed from the vehicle mounted camera array (e.g., cameras 110a,b,c,d,e,f,g,h) (1110) and multi-view tracking of surround vehicles (1120), consistent with implementations described herein, are used to project the tracked vehicle locations to the ground place (1130). For each tracked vehicle 120, a maneuver recognition module 1140 generates maneuver likelihoods, and a trajectory prediction 1150 module generates predictions for a number of maneuvers (1170), as further described herein. A vehicle interaction module 1160 takes as input the generated maneuver likelihoods and the generated predictions for the number of maneuvers to output recognized maneuvers and predicted trajectories (1180), as further described herein.

The motion prediction framework 1100 estimates the future positions and the associated prediction uncertainty for all vehicles in the frame of reference of the vehicle 100 over the next $t_f$ seconds, given a $t_h$ second snippet of the most recent track histories of the tracked vehicles. The trajectory prediction module 1150 outputs a linear combination of the trajectories predicted by a motion model that leverages the estimated instantaneous motion of the surround vehicles and a probabilistic trajectory prediction model which learns motion patterns of vehicles on freeways from a freeway trajectory training set. Constant velocity (CV), constant acceleration (CA), and constant turn rate and velocity (CTRV) models are used in the interacting multiple model (IMM) framework as the motion models since these capture most instances of freeway motion, especially in light traffic conditions. Variational Gaussian Mixture Models (VGMM) are used for probabilistic trajectory prediction owing to promising results for vehicle trajectory prediction at intersections.

The motion model becomes, in some instances, unreliable for long term trajectory prediction, especially in cases involving a greater degree of decision making by drivers such as overtakes, cut-ins, or heavy traffic conditions. These cases are critical from a safety stand-point. However, since these are relatively rare occurrences, they tend to be poorly modeled by a monolithic probabilistic prediction model. Thus, to account for this, according to aspects of the current subject matter, surround vehicle motion on freeways is binned or grouped into ten maneuver classes, with each maneuver class capturing a distinct pattern of motion that may be useful for future prediction. The intra-maneuver variability of vehicle motion is captured through a VGMM learned for each maneuver class. The maneuver recognition module recognizes the maneuver being performed by a vehicle based on a snippet of its most recent track history. Hidden Markov models (HMM) are used for this purpose. The VGMM corresponding to the most likely maneuver can then be used for predicting the future trajectory. Thus, consistent with implementations of the current subject matter, the maneuver recognition module 1140 and the trajectory prediction module 1150 may be used in conjunction for each vehicle to make more reliable predictions.

The relative configuration of all vehicles in the scene may make certain maneuvers infeasible and certain others more likely, making it a useful cue for trajectory prediction especially in heavy traffic conditions. The vehicle interaction module 1160 leverages this cue. The maneuver likelihoods and predicted trajectories for the K likeliest maneuvers for each vehicle being tracked are passed to the vehicle interaction module 1160. The vehicle interaction module 1160 includes a Markov random field aimed at optimizing an energy function over the discrete space of maneuver classes for all vehicles in the scene. The energy function takes into account the confidence values for all maneuvers given by the HMM and the feasibility of the maneuvers given the relative configuration of all vehicles in the scene. Minimizing the energy function gives the recognized maneuvers and corresponding trajectory predictions for all vehicles in the scene.

Figure 12:
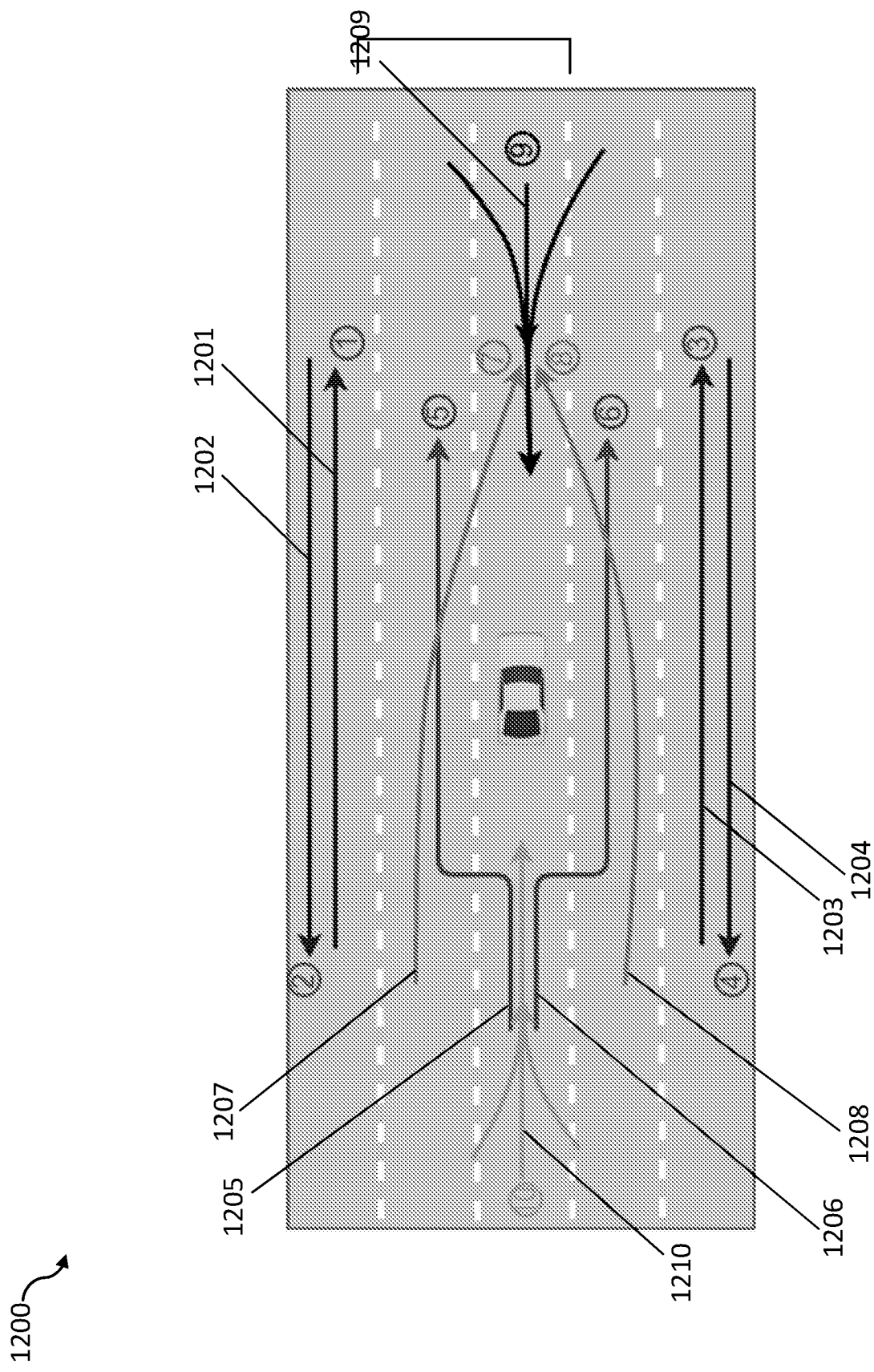
FIG. 12 is a diagram illustrating defined maneuver classes for surround vehicle motion consistent with implementations of the current subject matter.

Ten maneuver classes are defined for surround vehicle motion on freeways consistent with implementations of the current subject matter. Diagram 1200 in FIG. 12 illustrates the following maneuver classes:

Lane Passes 1201, 1202, 1203, 1204: Lane pass maneuvers involve vehicles passing the vehicle 100 without interacting with the vehicle lane. These constitute a majority of the surround vehicle motion on freeways and are relatively easy cases for trajectory prediction owing to approximately constant velocity profiles. Four different lane pass maneuvers are defined as shown in FIG. 12.

Overtakes 1205, 1206: Overtakes start with the surround vehicle behind the vehicle 100 in the vehicle lane. The surround vehicle changes lane and accelerates in order to pass the vehicle 100. Two different overtake maneuvers, depending on which side the surround vehicle overtakes, are defined.

Cut-ins 1207, 1208: Cut-ins involve a surround vehicle passing the vehicle 100 and entering the vehicle lane in front of the vehicle 100. Cut-ins and overtakes, though relatively rare, can be critical from a safety stand-point and also prove to be challenging cases for trajectory prediction. Two different cut-ins, depending on which side the surround vehicle cuts in from, are defined.

Drift into Vehicle Lane 1209, 1210: Another important maneuver class is when a surround vehicle drifts into the vehicle 100 lane in front or behind the vehicle 100. This is also important from a safety standpoint as it directly affects how sharply the vehicle 100 can accelerate or decelerate. A separate class is defined for drifts into vehicle lane in front and to the rear of the vehicle 100.

Hidden Markov models (HMMs) may capture the spatial and temporal variability of trajectories. HMMs can be thought of as combining two stochastic models, an underlying Markov chain of states characterized by state transition probabilities and an emission probability distribution over the feature space for each state. The transition probabilities model the temporal variability of trajectories while the emission probabilities model the spatial variability, making HMMs a viable approach for maneuver recognition.

Consistent with implementations of the current subject matter, the HMMs classify a maneuver based on a small $t_h$ second snippet of the trajectory. The trajectory snippet may be from any point in the maneuver, and not necessarily the start. The HMM classifies a maneuver based on any intermediate snippet of the trajectory. The trajectories are thus divided in the training data into overlapping snippets of $t_h$ seconds, and the maneuver HMMs are trained using these snippets.

For each maneuver, a separate HMM is trained with a left-right topology with only self-transitions and transitions to the next state. The state emission probabilities are modeled as mixtures of Gaussians with diagonal covariances. The x and y ground plane coordinates and instantaneous velocities in the x and y direction are used as features for training the HMMs. The parameters of the HMMs: the state transition probabilities and the means, variances, and weights of the mixture components are estimated using the Baum-Welch algorithm.

For a vehicle i, the HMM for maneuver k outputs the log likelihood:

$$L_k^i = \log(P(x_h^i, y_h^i, v_{x_h}^i, v_{y_h}^i, |m^i=k; \Theta_k))$$

where $x_h^i$, $y_h^i$ are the x and y locations of vehicle i over the last $t_h$ seconds and $v_{x_h}^i$, $v_{y_h}^i$ are the velocities along the x and y directions over the last $t_h$ seconds. $m^i$ is the maneuver assigned to car i, and $\Theta_k$ are the parameters of the HMM for maneuver k.

The trajectory prediction module 1150 predicts the future x and y locations of surround vehicles over a prediction horizon of $t_f$ seconds and assigns an uncertainty to the predicted locations in the form of a 2×2 covariance matrix. It averages the predicted future locations and covariances given by both a motion model and a probabilistic trajectory prediction model. The outputs of the trajectory prediction module 1150 for a prediction instant $t_{pred}$ are given by:

$$x_f(t) = \frac{1}{2}\left(x_{f_{motion}}(t) + x_{f_{prob}}(t)\right)$$

$$y_f(t) = \frac{1}{2}\left(y_{f_{motion}}(t) + y_{f_{prob}}(t)\right)$$

$$\sum\nolimits_f(t) = \frac{1}{2}\left(\sum\nolimits_{f_{motion}}(t) + \sum\nolimits_{f_{prob}}(t)\right)$$

where $t_{pred} \leq t \leq t_{pred} + t_f$

The interacting multiple model (IMM) framework is used for modeling vehicle motion. The IMM framework allows for combining an ensemble of Bayesian filters for motion estimation and prediction by weighing the models with probability values. The probability values are estimated at each time step based on the transition probabilities of an underlying Markov model and how well each model fits the observed motion prior to that time step. The following motion models are used consistent with implementations of the current subject matter:

Constant velocity (CV): The constant velocity models maintains an estimate of the position and velocity of the surround vehicles under the constraint that the vehicles move with a constant velocity. A Kalman filter may be used for estimating the state and observations of the CV model. The CV model captures a majority of freeway vehicle motion.

Constant acceleration (CA): The constant acceleration model maintains estimates of the vehicle position, velocity, and acceleration under the constant acceleration assumption using a Kalman filter. The CA model can be useful for describing freeway motion especially in dense traffic.

Constant turn rate and velocity (CTRV): The constant turn rate and velocity model maintains estimates of the vehicle position, orientation, and velocity magnitude under the constant yaw rate and velocity assumption. Since the state update for the CTRV model is non-linear, an extended Kalman filter is used for estimating the state and observations of the CTRV model. The CTRV model can be useful for modeling motion during lane changes.

Probabilistic trajectory prediction is formulated as estimating the conditional distribution:

$$P(v_{xf}, v_{yf} | x_h, y_h, v_{xh}, v_{yh}, m)$$

where the conditional distribution of the vehicle's predicted velocities given the vehicle's past positions, velocities, and maneuver class. In particular, estimates of the conditional expected values $[v_{xf}; v_{yf}]$ and conditional covariance $\Sigma_{vf}$ of the above distribution are of interest. The predicted locations and $x_{f_{prob}}, y_{f_{prob}}$ may then be obtained by taking the cumulative sum of the predicted velocities, which can be represented using an accumulator matrix A:

$$[x_{f_{prob}}; y_{f_{prob}}] = A[\hat{v}_{xf}; \hat{v}_{yf}]$$

Similarly, the uncertainty of prediction $\Sigma_{prob}$ may be obtained using the expression:

$$\Sigma_{f_{prob}} = A\Sigma_{vf} A^T$$

$(x_h, y_h, v_{xh}, v_{yh})$ and $(v_{xf}, v_{yf})$ are represented in terms of their Chebyshev coefficients, $c_h$ and $c_f$. The joint distribution $P(c_f, c_h | m)$ for each maneuver class is estimated as the predictive distribution of a variational Gaussian mixture model (VGMM). The conditional distribution $P(c_f | c_h, m)$ may then be estimated in terms of the parameters of the predictive distribution.

VGMMs are the Bayesian analogue to standard GMMs, where the model parameters, $\{\pi, \mu 1, -2, \ldots, \mu K, \Lambda 1, \Lambda 2, \ldots \Lambda K\}$ are given conjugate prior distributions. The prior over mixture weights $\pi$ is a Dirichlet distribution:

$$P(\pi) = Dir(\pi | \alpha_0)$$

The prior over each component mean $\mu_k$ and component precision $\Lambda_k$ is an independent Gauss-Wishart distribution:

$$P(\mu_k, \Lambda_k) = \mathcal{N}(\mu_k | m_{0_k}, (\beta_{0_k} \Lambda_k)^{-1}) \mathcal{W}(\Lambda_k | W_{0_k}, v_{0_k})$$

The parameters of the posterior distributions are estimated using the Variational Bayesian Expectation Maximization algorithm. The predictive distribution for a VGMM is given by a mixture of Student's t-distributions:

$$P(c_h, c_f) = \frac{1}{sum(\alpha)} \sum_{k=1}^{K} \alpha_k St(c_h, c_f | m_k, L_k, v_k + 1 - d)$$

where d is the number of degrees of freedom of the Wishart distribution and:

$$L_k = \frac{(v_k + 1 - d)\beta_k}{1 + \beta_k} W_k$$

For a new trajectory history $c_h$, the conditional predictive distribution $P(c_f | c_h)$ is given by:

$$P(c_f | c_h) = \frac{1}{sum(\hat{\alpha})} \sum_{k=1}^{K} \hat{\alpha}_k St(c_f | c_h, \hat{m}_k, L_k, v_k + 1 - d)$$

where $$\hat{v}_k = v_k + 1 - d$$

$$\hat{\alpha}_k = \frac{\alpha_k St(c_h | m_{k,c_h}, L_{k,c_k}, \hat{v}_k)}{\sum_{j=1}^{K} \alpha_j St(c_h | m_{j,c_h}, L_{j,c_h}, \hat{v}_j)}$$

$$\hat{m}_k = m_{k,c_f} + \sum_{k,c_f c_h} \sum_{k,c_k,c_h}^{-1} (c_h - m_{k,c_h})$$

$$\hat{L}_k^{-1} = \frac{\hat{v}_k}{\hat{v}_k + d - 2}\left(1 + \Delta_k^T \frac{\sum_{k,c_k,c_h}}{\hat{v}_k} \Delta_k\right) \sum\nolimits_k^{*}$$

$$\Delta_k = (c_h - m_{k,c_h})$$

$$\sum\nolimits_k^{*} = \sum\nolimits_{k,c_f c_f} - \sum\nolimits_{k,c_f c_h} \sum\nolimits_{k,c_k c_h^{-1}} \sum\nolimits_{k,c_h c_f}$$

$$\sum_k = \frac{\hat{v}_k + d - 2}{\hat{v}_k + d} L_k^{-1}$$

Consistent with implementations of the current subject matter, the vehicle interaction module 1160 is tasked with assigning discrete maneuver labels to all vehicles in the scene at a particular prediction instant based on the confidence of the HMM in each maneuver class and the feasibility of the future trajectories of all vehicles based on those maneuvers given the current configuration of all vehicles in the scene. This may be viewed as an energy minimization problem. For a given prediction instant, let there be N surround vehicles in the scene with the top K maneuvers given by the HMM being considered for each vehicle. The minimization objective is given by:

$$y^* = \underset{y}{\operatorname{argmin}} \sum_{i=1}^{n} \sum_{k=1}^{K} y_k^i [E_{ik}^{hmm} + \lambda E_{ik}^{ego}] + \lambda \sum_{i=1}^{n} \sum_{k=1}^{K} \sum_{\substack{j=1 \\ j \neq i}}^{n} \sum_{l=1}^{K} y_k^i y_l^j E_{ijkl}^{vi}$$

s.t.

$$\sum_k y_k^i = 1 \; \forall \, i$$

$$y_k^i = \begin{cases} 1, & \text{if car } i \text{ is assigned maneuver } k \\ 0, & \text{otherwise} \end{cases}$$

The objective includes of three types of energies, the individual Energy terms $E_{ik}^{hmm}$, $E_{ik}^{ego}$ and the pairwise energy terms $E_{ijkl}^{vi}$. The individual energy terms $E_{ik}^{hmmm}$ are given by the negative of the log likelihoods provided by the HMM. Higher the confidence of an HMM in a particular maneuver, lower is $-L_k^i$ and thus the individual energy term. The individual energy term $E_{ik}^{ego}$ r takes into account the interaction between surround vehicles and the vehicle 100. The $E_{ik}^{ego}$ is defined as the reciprocal of the closest point of approach for vehicle i and the vehicle 100 over the entire prediction horizon, given that it is performing maneuver k, where the vehicle position is always fixed to 0, since it is the origin of the frame of reference. Similarly, the pairwise energy term $E_{ijkl}^{vi}$ is defined as the reciprocal of the minimum distance between the corresponding predicted trajectories for the vehicles i and j, assuming them to be performing maneuvers k and l respectively. The terms $E_{ik}^{ego}$ and $E_{ijkl}^{vi}$ penalize predictions where at any point in the prediction horizon, two vehicles are very close to each other. This term leverages the fact that drivers tend to follow paths with low possibility of collisions with other vehicles. The weighting constant λ is experimentally determined through cross-validation.

The minimization objective in the formulation shown above has quadratic terms in y values. In order to leverage integer linear programming for minimizing the energy, the formulation is modified as follows:

$$y^*, z^* = \underset{y,z}{\operatorname{argmin}} \sum_{i=1}^{n} \sum_{k=1}^{K} y_k^i [E_{ik}^{hmm} + \lambda E_{ik}^{ego}] + \lambda \sum_{i=1}^{n} \sum_{k=1}^{K} \sum_{\substack{j=1 \\ j \neq i}}^{n} \sum_{l=1}^{K} z_{k,l}^{i,j} E_{ijkl}^{vi}$$

s.t.

$$\sum_k y_k^i = 1 \; \forall \, i$$

$$y_k^i \in 0, 1$$

$$z_{k,l}^{i,j} \leq y_k^i$$

$$z_{k,l}^{i,j} \leq y_l^j$$

$$z_{k,l}^{i,j} \geq y_k^i + y_l^j - 1$$

This objective may be optimized using integer linear programming, where the optimal values y* give the maneuver assignments for each of the vehicles. These assigned maneuver classes are used by the trajectory prediction module to make future predictions for all vehicles.

Experimental analysis was performed to validate the motion prediction framework 1100 of the current subject matter described herein and with reference to FIGS. 10-12. A setup as shown in FIG. 1A, with full-surround vision sensors (cameras 110a,b,c,d,e,f,g,h), ensures full surround coverage of the scene around the vehicle 100, while retaining a sufficient overlap between adjacent camera views. In addition to full vision coverage, the experimental setup included full-surround Radar and LiDAR fields of view capturing the full surround at a frame rate of 15 fps. Real freeway traffic data was captured. The complete dataset includes 52 video sequences extracted from multiple drives spanning approximately 45 minutes. The sequences were chosen to capture varying lighting conditions, vehicle types, and traffic density and behavior.

The four longest video sequences, of about three minutes each, were ground-truthed by human annotators and used for evaluation. Three sequences from the evaluation set represent light to moderate or free-flowing traffic conditions, while the remaining sequence represents heavy or stop-and-go traffic.

Figure 13:
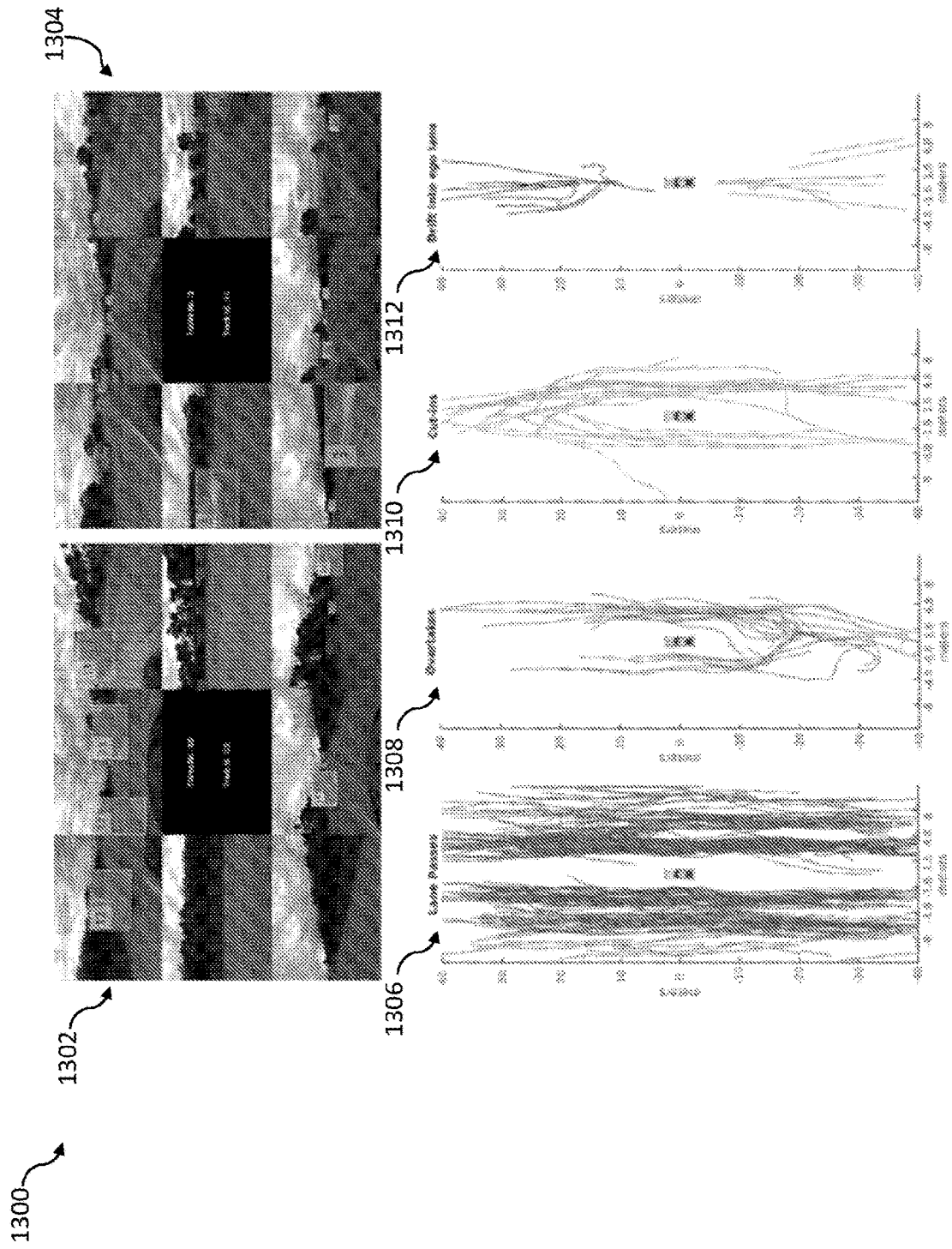
FIG. 13 is a diagram illustrating track annotations and trajectories belonging to maneuver classes consistent with implementations of the current subject matter.

The video feed from the evaluation set was annotated with detection boxes and vehicle track identifiers for each of the eight views. All tracks were then projected to the ground plane and assigned a maneuver class label corresponding to the ten maneuver classes described herein. If a vehicle track included multiple maneuvers, the start and end point of each maneuver was marked. A multi-perspective tracker was used for assigning vehicle tracks for the remaining 48 sequences. These tracks were only used for training the models. FIG. 13 is a diagram 1300 illustrating track annotations as well as the complete set of trajectories belonging to each maneuver class. The images in 1302 and 1304 are examples of annotated frames from the experimental evaluation. Lane pass trajectories 1306, overtake trajectories 1308, cut-in trajectories 1310, and drift-in trajectories 1312 are also shown in FIG. 13.

Since each trajectory is divided into overlapping snippets of $t_h=3$ seconds for training and testing the models, the data statistics are reported (as shown in Table 3) in terms of the total number of trajectories as well as the number of trajectory snippets belonging to each maneuver class.

TABLE 3

| Maneuver | Number of trajectories | Number of trajectory snippets |
|---|---|---|
| Lane Pass (Left Froward) | 59 | 9500 |
| Lane Pass (Left Back) | 75 | 10332 |
| Lane Pass (Right Forward) | 110 | 10123 |
| Lane Pass (Right Back) | 48 | 12523 |

TABLE 3-continued

| Maneuver | Number of trajectories | Number of trajectory snippets |
|---|---|---|
| Overtake (Left) | 8 | 1629 |
| Overtake (Right) | 17 | 2840 |
| Cut-in (Left) | 8 | 1667 |
| Cut-in (Right) | 19 | 3201 |
| Drift into ego lane (Front) | 11 | 1317 |
| Drift into ego lane (Rear) | 8 | 553 |

Results are reported using a leave on sequence cross-validation scheme. For each of the four evaluation sequences, the HMMs and VGMMs are trained using data from the remaining three evaluation sequences as well as the 48 training sequences. Additionally, two simple data-augmentation schemes are used for increasing the size of the training datasets in order to reduce overfitting in the models:

Lateral inversion: each trajectory is flipped along the lateral direction in the vehicle frame to give an instance of a different maneuver class. For example, a left cut-in on lateral inversion becomes a right cut-in.

Longitudinal shifts: each of the trajectories are shifted by ±2, 4, and 6 m in the longitudinal direction in the vehicle frame to give additional instances of the same maneuver class. Lateral shifts are avoided since this may interfere with lane information that is implicitly learned by the probabilistic model.

The motion prediction framework 1100 consistent with implementations of the current subject matter predicts the future trajectory over a prediction horizon of 5 seconds for each three second snippet of track history based on the maneuver classified by the HMMs or by the vehicle interaction module 1160. The following evaluation measures are used for reporting results:

Mean Absolute Error: This measure gives the average absolute deviation of the predicted trajectories from the underlying ground truth trajectories. To compare how the models perform for short term and long term predictions, this measure is reported separately for prediction instants up to 5 seconds into the future, sampled with increments of one second. The mean absolute error captures the effect of both the number of errors made by the model as well as the severity of the errors.

Median Absolute Error: The median values of the absolute deviations are reported for up to 5 seconds into the future with one second increments. The median absolute error better captures, in some instances, the distribution of the errors made by the model while sifting out the effect of a few drastic errors.

Maneuver classification accuracy: Maneuver classification accuracy is reported for configurations using the maneuver recognition module 1140 or the vehicle interaction module 1160.

Execution time: The average execution time per frame is reported, where each frame involves predicting trajectories of all vehicles being tracked at a particular instant.

In order to analyze the effect of each of the proposed modules, the trajectory prediction results are compared for the following systems:

Motion model (IMM): The trajectories predicted by the IMM based motion model are used as the baseline.

Monolithic VGMM (M-VGMM): The trajectories predicted by the trajectory prediction module 1150 are considered, where the probabilistic model used is a single monolithic VGMM. This may in some instances alleviate the need for the maneuver recognition module 1140, since the same model makes predictions irrespective of the maneuver being performed.

Class VGMMs (C-VGMM): Separate VGMMs are considered for each maneuver class in the trajectory prediction module 1150. The VGMM corresponding to the maneuver with the highest HMM log likelihood is used for making the prediction. In this case, maneuver predictions for each vehicle are made independent of the other vehicles in the scene. To keep the comparison with the M-VGMM fair, eight mixture components are used for each maneuver class for the C-VGMMs, while a single VGMM with 80 mixture components is used for the M-VGMM, ensuring that both models have the same complexity.

Class VGMMs with Vehicle Interaction Module (C-VGMM+VIM): The effect of using the vehicle interaction module 1160 is considered. In this case, the C-VGMMs are used with the maneuver classes for each of the vehicles in the scene assigned by the vehicle interaction module 1160.

The experimental results are reported for the complete set of trajectories in the evaluation set. Additionally, results are reported on the subsets of overtake and cut-in maneuvers and stop-and-go traffic. Since overtakes and cut-ins are rare safety critical maneuvers with significant deviation from uniform motion, these are challenging cases for trajectory prediction. Similarly, due to the high traffic density in stop-and-go scenarios, vehicles affect each other's motion to a much greater extent as compared to free-flowing traffic, making it a challenging scenario for trajectory prediction.

Table 4 shows the quantitative results of the ablation experiments. The results on the complete evaluation set indicate that the probabilistic trajectory prediction models outperform the baseline of the IMM. The M-VGMM has lower values for both mean as well as median absolute error as compared to the IMM, suggesting that the probabilistic model makes fewer as well as less drastic errors on an average. We get further improvements in mean and median absolute deviations using the C-VGMMs, suggesting that subcategorizing trajectories into maneuver classes leads to a better probabilistic prediction model.

TABLE 4

| Metric | Setting Prediction Horizon (s) | All Trajectories | | | | Overtakes and Cut-ins | | | Stop-and-Go Traffic | | |
|---|---|---|---|---|---|---|---|---|---|---|---|
| | | IMM | M-VGMM | C-VGMM | C-VGMM + VIM | IMM | M-VGMM | C-VGMM | IMM | C-VGMM | C-VGMM + VIM |
| Mean Absolute | 1 | 0.25 | 0.24 | 0.24 | 0.24 | 0.29 | 0.32 | 0.29 | 0.22 | 0.20 | 0.20 |
| | 2 | 0.72 | 0.70 | 0.69 | 0.69 | 0.83 | 0.87 | 0.82 | 0.68 | 0.65 | 0.64 |

TABLE 4-continued

| | Setting | All Trajectories | | | | Overtakes and Cut-ins | | | Stop-and-Go Traffic | | |
|---|---|---|---|---|---|---|---|---|---|---|---|
| Metric | Prediction Horizon (s) | IMM | M-VGMM | C-VGMM | C-VGMM + VIM | IMM | M-VGMM | C-VGMM | IMM | C-VGMM | C-VGMM + VIM |
| Error (m) | 3 | 1.25 | 1.19 | 1.18 | 1.18 | 1.47 | 1.46 | 1.39 | 1.21 | 1.17 | 1.14 |
| | 4 | 1.78 | 1.70 | 1.68 | 1.66 | 2.17 | 2.05 | 1.94 | 1.74 | 1.68 | 1.65 |
| | 5 | 2.36 | 2.24 | 2.20 | 2.18 | 2.90 | 2.68 | 2.49 | 2.29 | 2.21 | 2.17 |
| Median Absolute Error (m) | 1 | 0.19 | 0.17 | 0.17 | 0.17 | 0.23 | 0.23 | 0.23 | 0.15 | 0.13 | 0.13 |
| | 2 | 0.55 | 0.52 | 0.52 | 0.52 | 0.68 | 0.65 | 0.65 | 0.48 | 0.46 | 0.45 |
| | 3 | 0.96 | 0.92 | 0.91 | 0.91 | 1.24 | 1.13 | 1.12 | 0.89 | 0.87 | 0.83 |
| | 4 | 1.38 | 1.32 | 1.30 | 1.29 | 1.92 | 1.71 | 1.68 | 1.32 | 1.29 | 1.27 |
| | 5 | 1.85 | 1.77 | 1.72 | 1.72 | 2.64 | 2.27 | 2.12 | 1.8 | 1.78 | 1.75 |
| Class. acc (%) | — | — | — | 83.49 | 84.24 | — | — | 55.89 | — | 84.84 | 87.19 |
| Exec. time (%) | — | — | 0.0346 | 0.1241 | 0.0891 | 0.1546 | — | — | — | — | — |

This is further highlighted based on the prediction results for the challenging maneuver classes of overtakes and cut-ins. The C-VGMM significantly outperforms the CV and M-VGMM models both in terms of mean and median absolute deviation for overtakes and cut-ins. This trend becomes more pronounced as the prediction horizon is increased. This suggests that the motion model is more error prone due to the non-uniform motion in overtakes and cut-ins while these rare classes get underrepresented in the distribution learned by the monolithic M-VGMM. Both of these issues get addressed through the C-VGMM.

Comparing the maneuver classification accuracies for the case of C-VGMM and C-VGMM+VIM, the vehicle interaction module 1160 corrects some of the maneuvers assigned by the HMM. This in turn leads to improved trajectory prediction, as seen from the mean and median absolute error values. This effect is more pronounced in case of stop-and-go traffic, since the dense traffic conditions cause more vehicles to affect each other's motion, leading to a greater proportion of maneuver class labels to be re-assigned by the vehicle interaction module 1160.

Table 4 also shows the average execution time per frame for the four system configurations considered. The IMM baseline has the lowest execution time since all other configurations build upon it. The C-VGMM runs faster than the M-VGMM in spite of having the overhead of the HMM based maneuver recognition module 1140. This is because the M-VGMM is a much bulkier model as compared to any single maneuver C-VGMM. Thus, in spite of involving an extra step, the maneuver recognition module 1140 effectively reduces the execution time while improving performance. The vehicle interaction module 1160 is a more time intensive overhead and almost doubles the run time of the C-VGMM. However, even in its most complex setting, the proposed framework can be deployed at a frame rate of almost 6 fps, which is in some instances more than sufficient for the application being considered.

FIGS. 14A-14D illustrate trajectories predicted by the CV, M-VGMM, and C-VGMM models for eight different instances consistent with implementations of the current subject matter. Shown in each are track history 1401, ground truth 1402, IMM 1403, M-VGMM 1404, and C-VGMM 1405.

Figures 14A, 14B:
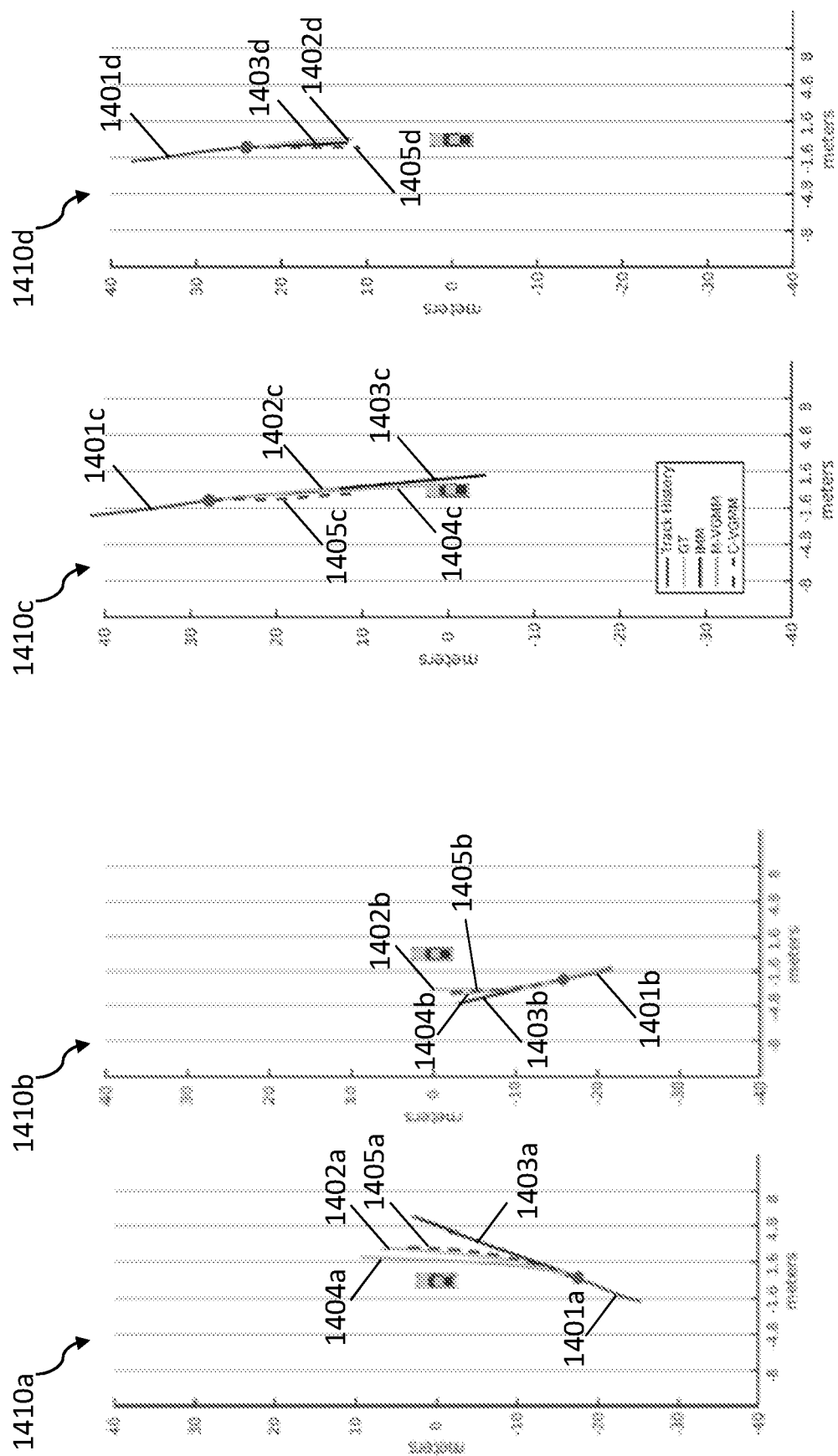
FIGS. 14A-14D are diagrams illustrating predicted trajectories consistent with implementations of the current subject matter.

FIG. 14A illustrates two prediction instances 1410a and 1410b where the vehicle 100 is just about to start the non-linear part of overtake maneuvers. As shown, the IMM 1403a,b makes erroneous predictions in both cases. However, both the M-VGMM 1404a,b and C-VGNIM 1405a,b manage to predict the non-linear future trajectory.

FIG. 14B illustrates two prediction instances 1410c and 1410d in the early part of overtake maneuvers. As shown, both the IMM 1403c,d and M-VGMM 1404c,d make errors in prediction. However, the position of the surround vehicle along with the slight lateral motion provide enough context to the maneuver recognition module 1140 to detect the overtake maneuver early. Thus, the C-VGMM 1405c,d manages to predict that the surround vehicle would move to the adjacent lane and accelerate in the longitudinal direction, although there is no such cue from the vehicle's existing state of motion.

Figures 14C, 14D:
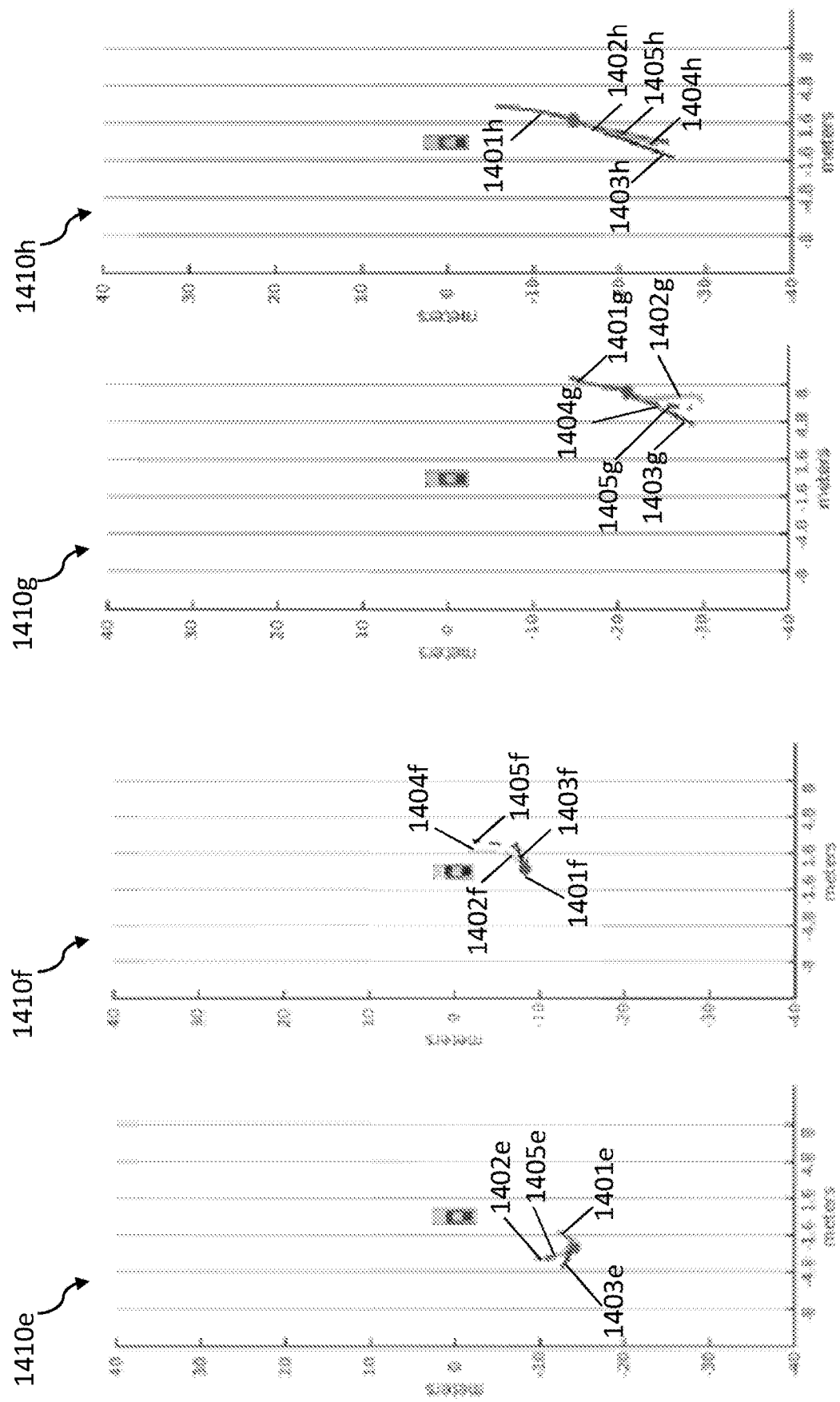

FIG. 14C illustrate two instances 1410e and 1410f of the trajectory of a vehicle that decelerates as it approaches the vehicle 100 from the front. This trajectory corresponds to the drift into vehicle lane maneuver class. In the first case (1410e), the vehicle has not started decelerating, causing the IMM 1403e to assign a high probability to the CV model. The IMM thus predicts the vehicle to keep moving at a constant velocity and come dangerously close to the vehicle 100. Similarly, the M-VGMM 1404e makes a poor prediction since these maneuvers are underrepresented in the training data. The C-VGMM 1405e however manages to correctly predict the surround vehicle to decelerate. In the second case (1410f), it is shown that the vehicle has already started decelerating. This allows the IMM 1403f to assign a greater weight to the CA model and correct its prediction FIG. 14D illustrate two instances 1410g and 1410h of the lane pass right back maneuver that is well represented in the training data. The vehicle makes a lane change in both of these instances. As shown, the IMM 1403g,h poorly predicts these trajectories. However, both the M-VGMM 1404g,h and C-VGMM 1405g,h correctly predict the vehicle to merge into the lane, suggesting that the probabilistic models may have implicitly encoded lane information.

Figure 15A:
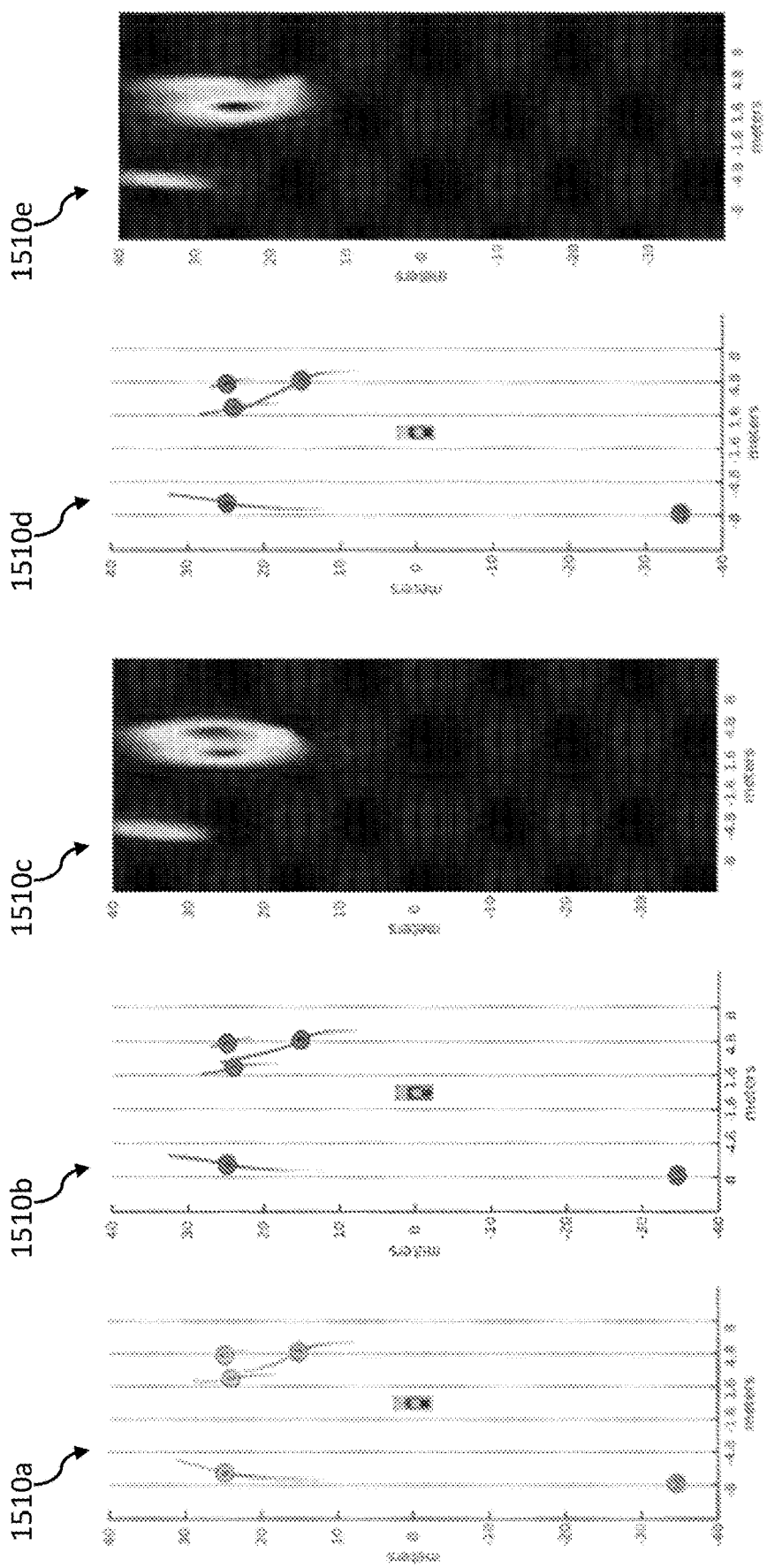
FIGS. 15A-15C are diagrams illustrating example cases of recognized maneuvers and predicted trajectories affected by a vehicle interaction module consistent with implementations of the current subject matter.
Figure 15B:
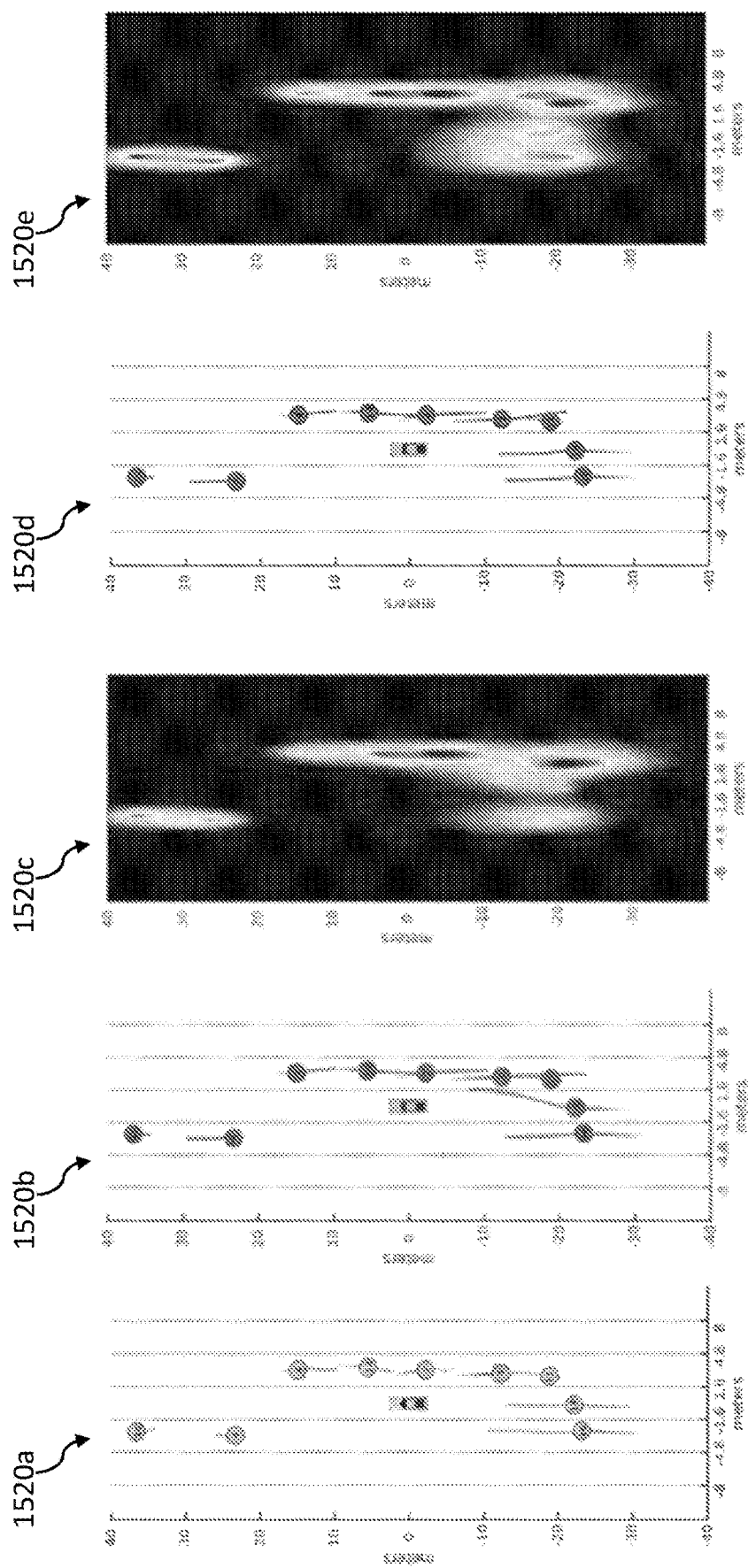
Figure 15C:
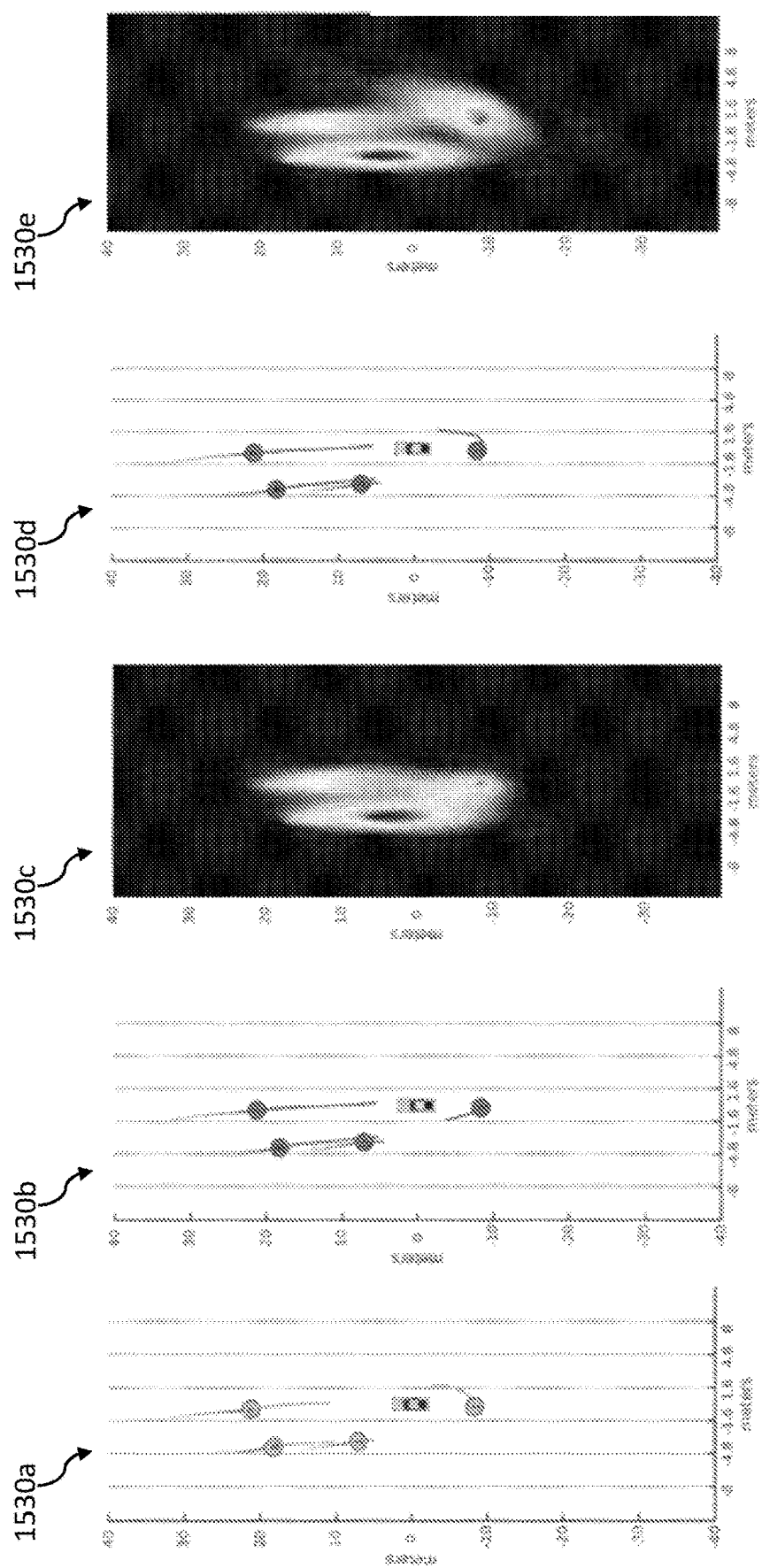

FIGS. 15A-C illustrates three cases where the recognized maneuvers and predicted trajectories are affected by the vehicle interaction module 1160 consistent with implementations of the current subject matter. 1510a, 1520a, and 1530a illustrate the ground truth of future tracks; 1510b, 1520b, and 1530b illustrate the predictions made for each vehicle independently; and 1510d, 1520d, and 1530d illustrate the predictions based on the vehicle interaction module 1160. 1510c, 1520c, and 1530c and 1510e, 1520e, and 1530e illustrate the prediction uncertainties for either case.

With reference to 1510a,b,c,d,e and in particular vehicle 3, 1510b shows that the HMM predicts the vehicle to perform a lane pass. However the vehicle's path forward is blocked by vehicles 1 and 5. The vehicle interaction module 1160 thus infers vehicle 3 to perform a cut-in with respect to the vehicle 100 in order to overtake vehicle 5 (1510d).

With reference to 1520a,b,c,d,e, the HMM (1520b) predicts vehicle 18 to overtake the vehicle 100 from the right. However, as shown, the right lane is occupied by vehicles 11, 3, and 2. These vehicles yield high values of pairwise energies with vehicle 18 for the overtake maneuver. The vehicle interaction module 1160 thus correctly manages to predict that vehicle 18 would end up tail-gating by assigning it the maneuver drift-in vehicle lane (rear) (1520d).

With reference to 1530a,b,c,d,e, the HMM (1530b) predicts vehicle 1 to overtake the vehicle 100 from the left. Again, the left lane is occupied by other vehicles, making the overtake impossible to execute from the left. However, compared to the previous case, these vehicles are slightly further away and can be expected to yield relatively smaller energy terms. However, these terms are enough to offset the very slight difference in the HMM's confidence values between the left and right overtake since both maneuvers do seem plausible if vehicle 1 is considered independently. Thus, the vehicle interaction module 1160 reassigns the maneuver for vehicle 1 to a right overtake (1530d), making the prediction closely match the ground truth.

Aspects of the current subject matter described herein relate to a full-surround camera and LiDAR based approach to multi-object tracking for autonomous vehicles. A 2-D multi-object tracking approach is extended based on a tracking-by-detection framework, enabling tracking objects in the real world. The tracking framework 200 consistent with implementations of the current subject matter is highly modular so that it is capable of working with various camera configurations with varying fields of view, and also with or without LiDAR sensors. A fusion scheme is adopted to handle object proposals from different sensors within a calibrated camera array.

Additional aspects of the current subject matter described herein relate to a unified motion prediction framework for surround vehicle maneuver recognition and motion prediction using vehicle mounted sensors. The motion prediction framework consistent with implementations of the current subject matter leverages the instantaneous motion of vehicles, an understanding of motion patterns of freeway traffic, and the effect of inter-vehicle interactions. The motion prediction framework incorporates probabilistic modeling of surround vehicle trajectories, which leads to better predictions as compared to a purely motion model based approach for many safety critical trajectories around the vehicle. Additionally, subcategorizing trajectories based on maneuver classes leads to better modeling of motion patterns. Finally, incorporating a model that takes into account interactions between surround vehicles for simultaneously predicting each of their motion leads to better prediction as compared to predicting each vehicle's motion independently.

Figure 16:
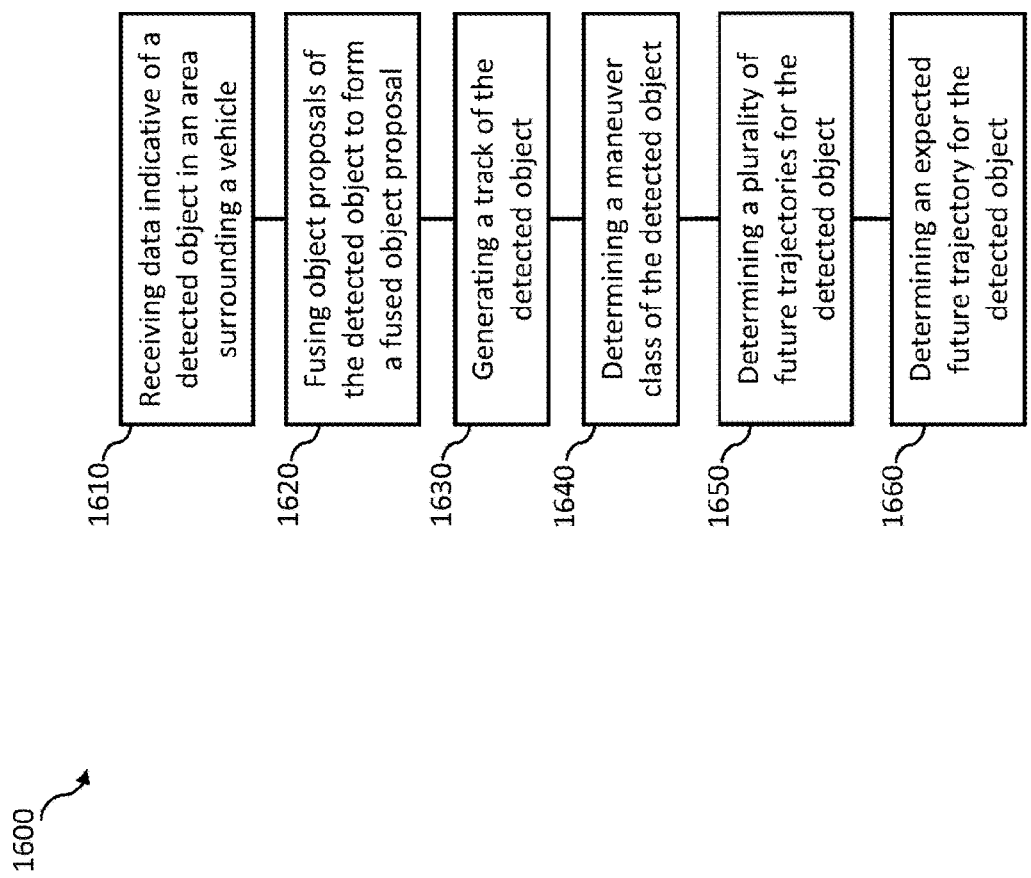
FIG. 16 depicts a flowchart illustrating a process for multi-object tracking and surround vehicle motion prediction consistent with implementations of the current subject matter.

FIG. 16 depicts a flowchart 1600 illustrating a process for multi-object tracking and surround vehicle motion prediction consistent with implementations of the current subject matter.

At 1610, data indicative of a detected object in an area at least partially surrounding the vehicle 100 is received. For example, a video feed, from the plurality of cameras 110a, b,c,d,e,f,g,h positioned on the vehicle 100, and at least one point cloud, from at least one LiDAR sensor positioned on the vehicle 100, is received.

At 1620, object proposals of the detected object identified from the received data are fused to form a fused object proposal such the fused object proposal is representative of detected object. The fused object proposal is formed, for example, by projecting the object proposals onto a global coordinate frame with respect to the vehicle 100 and combining a subset of object proposals determined to belong to the detected object.

At 1630, a track of the detected object is generated. The track is based on the fused object proposal and updated received data (e.g., data from the cameras 110a,b,c,d,e,f,g,h and the LiDAR sensors). The track may be generated by identifying a status of the detected object and, if the status is active, identifying a sequence of positions of the detected object based on the updated received data. The status of the detected object may be identified by a Markov Decision Process.

At 1640, a maneuver class of the detected object is determined. The maneuver class is indicative of motion of the detected object and is based on the generated track of the detected object. The maneuver class may be, for example, based on a Hidden Markov Model applied to a period of time of the generated track.

At 1650, a plurality of future trajectories for the detected object are determined. The future trajectories are based on the generated track and at least one of a motion model and/or a probabilistic model. The future trajectories may be determined by, for example, averaging predicted future locations and covariances provided by the motion model and/or the probabilistic model.

At 1660, an expected future trajectory for the detected object is determined. The expected future trajectory is based on the corresponding maneuver class and the plurality of future trajectories. For example, a feasibility assessment for each of the plurality of future paths may be done to identify one or more likely options. The feasibility assessment may be based on a configuration of other detected objects within a predefined range (for example, 40 meters) of the vehicle 100. The other detected objects may be detected and tracked consistent with implementations of the current subject matter.

The expected future trajectory may be used for a variety of applications. For example, an output representative of the expected future trajectory may be generated. The output may be a control signal responsive to the expected future trajectory and may serve to provide an update and/or a warning to one or more uses who may, for example, be monitoring activity of the vehicle 100. The control signal may be a signal received within the vehicle 100, for example if the vehicle 100 is being operated by a user. The control signal may also be used to adjust the path of the vehicle 100 to, for example, make adjustments in view of the expected future trajectory. This adjustment may be in for example a semi-autonomous or autonomous vehicle.

The expected future trajectory may be used to determine a margin of uncertainty, which may be based on the level of confidence of the probability models. The margin of uncertainty may be used to generate an output and/or may be used for various driver safety algorithms, for example cruise control, emergency braking, or other driving algorithms for semi-autonomous or autonomous driving.

FIG. 17 depicts a block diagram illustrating a computing system 1700 consistent with implementations of the current subject matter. Referring to FIGS. 2 and 11, the computing system 1700 can be used to implement the tracking framework 200 and the motion prediction framework 1100 and/or any components therein.

As shown in FIG. 17, the computing system 1700 can include a processor 1710, a memory 1720, a storage device 1730, and input/output devices 1740. The processor 1710, the memory 1720, the storage device 1730, and the input/output devices 1740 can be interconnected via a system bus 1750. The processor 1710 is capable of processing instructions for execution within the computing system 1700. Such executed instructions can implement one or more components of, for example, the tracking framework 200 and/or the motion prediction framework 1100. In some implementations of the current subject matter, the processor 1710 can be a single-threaded processor. Alternately, the processor 1710 can be a multi-threaded processor. The processor 1710 is capable of processing instructions stored in the memory 1720 and/or on the storage device 1730 to display graphical information for a user interface provided via the input/output device 1740.

The memory 1720 is a computer readable medium such as volatile or non-volatile that stores information within the computing system 1700. The memory 1720 can store data structures representing configuration object databases, for example. The storage device 1730 is capable of providing persistent storage for the computing system 1700. The storage device 1730 can be a floppy disk device, a hard disk device, an optical disk device, or a tape device, or other suitable persistent storage means. The input/output device 1740 provides input/output operations for the computing system 1700. In some implementations of the current subject matter, the input/output device 1740 includes a keyboard and/or pointing device. In various implementations, the input/output device 1740 includes a display unit for displaying graphical user interfaces.

According to some implementations of the current subject matter, the input/output device 1740 can provide input/output operations for a network device. For example, the input/output device 1740 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
    receiving, by at least one data processor and from one or more sensors positioned on a vehicle, data indicative of a detected object in an area at least partially surrounding the vehicle;
    fusing, by the at least one data processor, object proposals of the detected object identified from the received data to form a fused object proposal such that the fused object proposal is representative of the detected object, wherein fusing object proposals comprises:
        projecting, by the at least one data processor, the object proposals onto a global coordinate frame with respect to the vehicle; and
        combining, by the at least one data processor and based on the projection of the object proposals, a subset of object proposals determined to belong to the detected object;
    generating, by the processing device, a track of the detected object, wherein the track is based on the fused object proposal and updated received data indicative of the detected object;
    determining, by the at least one data processor, a maneuver class of the detected object, the maneuver class indicative of motion of the detected object and based on the generated track;
    determining, by the at least one data processor, a plurality of future trajectories for the detected object, the plurality of future trajectories based on the generated track and at least one of a motion model or a probabilistic model; and
    determining, by the processing device, an expected future trajectory of the detected object based on the corresponding maneuver class and the plurality of future trajectories.

2. The computer-implemented method of claim 1, wherein the received data comprises:
    a video feed, from a plurality of cameras positioned on the vehicle, of the area at least partially surrounding the vehicle; and
    at least one point cloud, from at least one LiDAR sensor positioned on the vehicle, the at least one point cloud comprising LiDAR data associated with the area at least partially surrounding the vehicle.

3. The computer-implemented method of claim 1, wherein generating the track of the detected object comprises:
    identifying, by the at least one data processor, a status of the detected object; and
    identifying, by the at least one data processor and if the status is an active status, a sequence of positions of the detected object based on the updated received data.

4. The computer-implemented method of claim 3, wherein the status of the detected object is identified by a Markov Decision Process.

5. The computer-implemented method of claim 1, wherein the maneuver class of the detected object is based on a Hidden Markov Model applied to a period of time of the generated track.

6. The computer-implemented method of claim 1, wherein determining the plurality of future trajectories for the detected object comprises:
    averaging, by the at least one data processor, predicted future locations and covariances provided by the probabilistic model.

7. The computer-implemented method of claim 1, wherein the motion model comprises a constant velocity motion model, a constant acceleration motion model, and a constant turn rate and velocity motion model.

8. The computer-implemented method of claim 1, wherein the expected future trajectory for the detected object is based on a feasibility assessment of each of the plurality of future trajectories, wherein the feasibility assessment is based on a configuration of other detected objects within a predefined range of the vehicle.

9. The computer-implemented method of claim 1, further comprising:
    generating, by the at least one data processor, an output representative of the expected future trajectory of the detected object.

10. A system, comprising:
    at least one data processor; and
    at least one memory storing instructions which, when executed by the at least one data processor, result in operations comprising:
        receiving, from one or more sensors positioned on a vehicle, data indicative of a detected object in an area at least partially surrounding the vehicle;
        fusing object proposals of the detected object identified from the received data to form a fused object proposal such that the fused object proposal is representative of the detected object, wherein fusing object proposals comprises:
            projecting the object proposals onto a global coordinate frame with respect to the vehicle; and
            combining, based on the projection of the object proposals, a subset of object proposals determined to belong to the detected object;
        generating a track of the detected object, wherein the track is based on the fused object proposal and updated received data indicative of the detected object;
        determining a maneuver class of the detected object, the maneuver class indicative of motion of the detected object and based on the generated track;
        determining a plurality of future trajectories for the detected object, the plurality of future trajectories based on the generated track and at least one of a motion model or a probabilistic model; and
        determining an expected future trajectory of the detected object based on the corresponding maneuver class and the plurality of future trajectories.

11. The system of claim 10, wherein the received data comprises:
    a video feed, from a plurality of cameras positioned on the vehicle, of the area at least partially surrounding the vehicle; and
    at least one point cloud, from at least one LiDAR sensor positioned on the vehicle, the at least one point cloud comprising LiDAR data associated with the area at least partially surrounding the vehicle.

12. The system of claim 10, wherein generating the track of the detected object comprises:
   identifying a status of the detected object; and
   identifying, if the status is an active status, a sequence of positions of the detected object based on the updated received data.

13. The system of claim 12, wherein the status of the detected object is identified by a Markov Decision Process.

14. The system of claim 10, wherein the maneuver class of the detected object is based on a Hidden Markov Model applied to a period of time of the generated track.

15. The system of claim 10, wherein determining the plurality of future trajectories for the detected object comprises:
   averaging, by the at least one data processor, predicted future locations and covariances provided by the probabilistic model.

16. The system of claim 10, wherein the motion model comprises a constant velocity motion model, a constant acceleration motion model, and a constant turn rate and velocity motion model.

17. The system of claim 10, wherein the expected future trajectory for the detected object is based on a feasibility assessment of each of the plurality of future trajectories, wherein the feasibility assessment is based on a configuration of other detected objects within a predefined range of the vehicle.

18. The system of claim 10, wherein execution of the at least one memory storing instructions further result in:
   generating a control signal indicative of the expected future trajectory of the detected object.

19. A non-transitory computer-readable storage medium including program code, which when executed by at least one data processor, causes operations comprising:
   receiving, by at least one data processor a processing and from one or more sensors positioned on a vehicle, data indicative of a detected object in an area at least partially surrounding the vehicle;
   fusing, by the at least one data processor, object proposals of the detected object identified from the received data to form a fused object proposal such that the fused object proposal is representative of the detected object, wherein fusing object proposals comprises:
      projecting, by the at least one data processor, the object proposals onto a global coordinate frame with respect to the vehicle; and
      combining, by the at least one data processor and based on the projection of the object proposals, a subset of object proposals determined to belong to the detected object;
   generating, by the at least one data processor, a track of the detected object, wherein the track is based on the fused object proposal and updated received data indicative of the detected object;
   determining, by the at least one data processor, a maneuver class of the detected object, the maneuver class indicative of motion of the detected object and based on the generated track;
   determining, by the at least one data processor, a plurality of future trajectories for the detected object, the plurality of future trajectories based on the generated track and at least one of a motion model or a probabilistic model; and
   determining, by the at least one data processor, an expected future trajectory of the detected object based on the corresponding maneuver class and the plurality of future trajectories.

* * * * *

UNITED STATES PATENT AND TRADEMARK OFFICE
CERTIFICATE OF CORRECTION

| | | |
|---|---|---|
| PATENT NO. | : 11,906,625 B2 | Page 1 of 1 |
| APPLICATION NO. | : 16/960290 | |
| DATED | : February 20, 2024 | |
| INVENTOR(S) | : Rangesh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this
Twenty-eighth Day of January, 2025

Coke Morgan Stewart
*Acting Director of the United States Patent and Trademark Office*